United States Patent
Rao et al.

(10) Patent No.: US 12,316,651 B2
(45) Date of Patent: May 27, 2025

(54) DETECTING MICROSOFT .NET MALWARE USING MACHINE LEARNING ON .NET STRUCTURE

(71) Applicant: Palo Alto Networks, Inc., Santa Clara, CA (US)

(72) Inventors: Akshata Krishnamoorthy Rao, Mountain View, CA (US); Yaron Samuel, Tel Aviv (IL); Dominik Reichel, Kleive (DE); Robert Jung, Albuquerque, NM (US)

(73) Assignee: Palo Alto Networks, Inc., Santa Clara, CA (US)

( * ) Notice: Subject to any disclaimer, the term of this patent is extended or adjusted under 35 U.S.C. 154(b) by 190 days.

(21) Appl. No.: 17/730,083

(22) Filed: Apr. 26, 2022

(65) Prior Publication Data

US 2023/0344838 A1    Oct. 26, 2023

(51) Int. Cl.
   *H04L 9/00*      (2022.01)
   *G06N 20/20*     (2019.01)
   *H04L 9/40*      (2022.01)

(52) U.S. Cl.
   CPC ......... *H04L 63/1416* (2013.01); *G06N 20/20* (2019.01)

(58) Field of Classification Search
   CPC ..... H04L 63/1416; G06N 20/20; G06N 20/00
   See application file for complete search history.

(56) References Cited

U.S. PATENT DOCUMENTS

| | | |
|---|---|---|
| 8,042,186 B1 | 10/2011 | Polyakov |
| 8,499,283 B2 | 7/2013 | Mony |
| 8,549,635 B2 | 10/2013 | Muttik |
| 8,566,944 B2 | 10/2013 | Peinado |
| 8,955,120 B2 | 2/2015 | Antonov |
| 9,917,855 B1 | 3/2018 | Li |
| 10,572,665 B2 | 2/2020 | Jung |
| 10,762,200 B1 | 9/2020 | Salem |
| 10,795,996 B2 | 10/2020 | Chistyakov |
| 11,003,774 B2 | 5/2021 | Saxe |
| 11,126,720 B2 | 9/2021 | Miserendino |
| 2004/0205411 A1 | 10/2004 | Hong |
| 2016/0337400 A1 | 11/2016 | Gupta |
| 2018/0096230 A1 | 4/2018 | Luan |
| 2019/0243976 A1* | 8/2019 | Kuskov ................. G06F 21/51 |
| 2020/0202244 A1* | 6/2020 | Kumar .................. G06N 3/08 |
| 2020/0372150 A1* | 11/2020 | Salem .................. G06F 21/566 |
| 2021/0073374 A1* | 3/2021 | Mookken ............... G06F 21/54 |
| 2021/0117544 A1 | 4/2021 | Kurtz |
| 2022/0067146 A1* | 3/2022 | Cai ...................... G06F 21/566 |

FOREIGN PATENT DOCUMENTS

| | | |
|---|---|---|
| CN | 103842965 | 6/2014 |
| CN | 112005234 | 11/2020 |

* cited by examiner

*Primary Examiner* — Syed M Ahsan
(74) *Attorney, Agent, or Firm* — Van Pelt, Yi & James LLP

(57) ABSTRACT

The present application discloses a method, system, and computer system for detecting malicious .NET files. The method includes receiving a sample that comprises a .NET file, obtaining information pertaining to common language runtime (CLR) metadata and streams associated with the .NET file, and determining whether the sample is malware based at least in part on (i) a classifier, and (ii) the information pertaining to the CLR metadata and streams.

23 Claims, 17 Drawing Sheets

| Rid | Token | Offset | MappingFlags | MemberForward | ImportName | ImportScopt | Info |
|---|---|---|---|---|---|---|---|
| 1 | 0x1C000001 | 0x0001B5C6 | 0x104 | 0xC9 | 0x18E5 | 1 | CreateProcess |
| 2 | 0x1C000002 | 0x0001B5CE | 0x100 | 0xCB | 0x190A | 1 | GetTHreadContext |
| 3 | 0x1C000003 | 0x0001B5D6 | 0x100 | 0xCD | 0x1925 | 1 | Wow64GetThreadContext |
| 4 | 0x1C000004 | 0x0001B5DE | 0x100 | 0xCF | 0x1945 | 1 | SetTHreadContext |
| 5 | 0x1C000005 | 0x0001B5E6 | 0x100 | 0xD1 | 0x1960 | 1 | Wow64SetThreadContext |
| 6 | 0x1C000006 | 0x0001B5EE | 0x100 | 0xD3 | 0x1980 | 1 | REadProcessMemory |
| 7 | 0x1C000007 | 0x0001B5F6 | 0x100 | 0xD5 | 0x199C | 1 | WriteProcessMemory |
| 8 | 0x1C000008 | 0x0001B5FE | 0x100 | 0xD7 | 0x19B9 | 2 | NtUnmapViewOfSection |
| 9 | 0x1C000009 | 0x0001B606 | 0x100 | 0xD9 | 0x19E2 | 1 | VirtualAllocEx |
| 10 | 0x1C00000A | 0x0001B60E | 0x100 | 0xD8 | 0x19FB | 1 | ResumeThread |
| 11 | 0x1C00000B | 0x0001B616 | 0x100 | 0x1E1 | 0x3085 | 3 | LoadLibrary |
| 12 | 0x1C00000C | 0x0001B61E | 0x102 | 0x1E3 | 0x30A5 | 3 | GetProcAddress |

FIG. 3A

| Rid | Token | Offset | Name | Info |
|---|---|---|---|---|
| 1 | 0x1A000001 | 0x0001B5A2 | 0x18F3 | kernel32.dll |
| 2 | 0x1A000002 | 0x0001B5A4 | 0x19CE | ntdll.dll |
| 3 | 0x1A000003 | 0x0001B5A6 | 0x3091 | kernel32 |

| Rid | Token | Offset | MappingFlags | MemberForward | ImportName | ImportScopt | Info |
|---|---|---|---|---|---|---|---|
| 1 | 0x1C000001 | 0x0000ACD2 | 0x100 | 5 | 0x8D4 | 1 | ZwAllocateVirtualMemory |
| 2 | 0x1C000002 | 0x0000ACDA | 0x100 | 7 | 0x935 | 1 | ZwFreeVirtualMemory |
| 3 | 0x1C000003 | 0x0000ACE2 | 0x100 | 9 | 0x952 | 1 | LdrGetProcedureAddress |
| 4 | 0x1C000004 | 0x0000ACEA | 0x240 | 0x99 | 0 | 2 | |
| 5 | 0x1C000005 | 0x0000ACC2 | 0x340 | 0x9D | 0 | 2 | |
| 6 | 0x1C000006 | 0x0000ACFA | 0x240 | 0x9F | 0 | 2 | |
| 7 | 0x1C000007 | 0x0000AD02 | 0x240 | 0xA1 | 0 | 2 | |
| 8 | 0x1C000008 | 0x0000AD0A | 0x240 | 0xA3 | 0 | 2 | |
| 9 | 0x1C000009 | 0x0000AD12 | 0x240 | 0xA5 | 0 | 2 | |
| 10 | 0x1C00000A | 0x0000AD1A | 0x240 | 0xA7 | 0 | 2 | |
| 11 | 0x1C00000B | 0x0000AD22 | 0x240 | 0xA9 | 0 | 2 | |
| 12 | 0x1C00000C | 0x0000AD2A | 0x240 | 0xAB | 0 | 2 | |
| 13 | 0x1C00000D | 0x0000AD32 | 0x240 | 0xAD | 0 | 2 | |
| 14 | 0x1C00000E | 0x0000AD3A | 0x240 | 0xAF | 0 | 2 | |
| 15 | 0x1C00000F | 0x0000AD42 | 0x240 | 0xB1 | 0 | 2 | |
| 16 | 0x1C000010 | 0x0000AD4A | 0x240 | 0xB3 | 0 | 2 | |

FIG. 3C

| Rid | Token | Offset | RVA | ImplFlags | Flags | Name | Signature | ParamList | Info |
|---|---|---|---|---|---|---|---|---|---|
| 62 | 0x0600000003E | 0x0000A0B0 | 0x22B8 | 0 | 0x13 | 0x1604 | 0x15E | 0x2F | <CtrImplementationDetails>.Handle<System::Object^>.Get |
| 63 | 0x0600000003F | 0x0000A0BE | 0x22E4 | 0 | 0x13 | 0x163C | 0x16A | 0x2F | <CtrImplementationDetails>.Handle<System::Object^>.(dtor) |
| 64 | 0x06000000040 | 0x0000ADCC | 0x2214 | 0 | 0x13 | 0x1677 | 0x178 | 0x2F | <CtrImplementationDetails>.Handle<System::Object^>._handle |
| 65 | 0x06000000041 | 0x0000A0DA | 0x2244 | 0 | 0x13 | 0x16B3 | 0x151 | 0x2F | <CtrImplementationDetails>.Handle<System::Object^>.Set |
| 66 | 0x06000000042 | 0x0000A0E8 | 0x270C | 0 | 0x13 | 0x16EB | 0x18B | 0x30 | _initterm_e |
| 67 | 0x06000000043 | 0x0000A0F6 | 0x2740 | 0 | 0x13 | 0x1705 | 0x19D | 0x32 | _initterm |
| 68 | 0x06000000044 | 0x0000A104 | 0x276C | 0 | 0x13 | 0x170F | 0x1AF | 0x34 | <CtrImplementationDetails>.ThisModule.Handle |
| 69 | 0x06000000045 | 0x0000A122 | 0x27C8 | 0 | 0x13 | 0x173C | 0x185 | 0x34 | _initterm_m |
| 70 | 0x06000000046 | 0x0000A120 | 0x2794 | 0 | 0x13 | 0x1748 | 0x1CD | 0x36 | <CtrImplementationDetails>.ThisModule.ResolveMethod<voidco |
| 71 | 0x06000000047 | 0x0000A12E | 0x27FC | 0 | 0x13 | 0x17A6 | 0x1DE | 0x37 | _CxCallUnwindDtor |
| 72 | 0x06000000048 | 0x0000A13C | 0x2848 | 0x85 | 0x13 | 0x17C7 | 0x1DE | 0x39 | CxCallUnwindDeltor |
| 73 | 0x06000000049 | 0x0000A14A | 0x2894 | 0x85 | 0x13 | 0x17DF | 0x1EA | 0x3B | _CxCallUnwindVecDtor |
| 74 | 0x0600000004A | 0x0000A158 | 0x136F | 0x85 | 0x6013 | 0x180F | 0x206 | 0x40 | _WinMainCRTStartup |
| 75 | 0x0600000004B | 0x0000A166 | 0x1963 | 0x85 | 0x6013 | 0x1822 | 0x20A | 0x40 | _getFiberPtrId |
| 76 | 0x0600000004C | 0x0000A174 | 0x29FC | 0x85 | 0x6013 | 0x1831 | 0x211 | 0x40 | _amsg_exit |
| 77 | 0x0600000004D | 0x0000A182 | 0x16D9 | 0x85 | 0x6013 | 0x183C | 0xA6 | 0x40 | _security_init_cookie |
| 78 | 0x0600000004E | 0x0000A190 | 0x2A92 | 0x85 | 0x6013 | 0x1853 | 0x218 | 0x40 | Sleep |
| 79 | 0x0600000004F | 0x0000A19E | 0xB0A | 0x85 | 0x6013 | 0x1859 | 0x222 | 0x40 | <CtrImplementationDetails>.ThisModuleLoadException |

FIG. 3D

| Rid | Token | Offset | Name | Info |
|---|---|---|---|---|
| 1 | 0x1A000001 | 0x0000ACCE | 0x483 | ntdll.dll |
| 2 | 0x1A000002 | 0x0000ACD0 | 0 | |

| | 578e1077703caf61d1db2dbf322dc | | | | | |
|---|---|---|---|---|---|---|
| Module Name | Imports | OFTs | TimeDateStamp | ForwarderChain | Name RVA | FTs (IAT) |
| 0000E83E | N/A | 0000E224 | 0000E228 | 0000E22C | 0000E230 | 0000E234 |
| szAnsi | (nFunctions) | Dword | Dword | Dword | Dword | Dword |
| MSVCR80.dll | 29 | 0000F09C | 00000000 | 00000000 | 0000F240 | 0000303C |
| KERNEL32.dll | 14 | 0000F060 | 00000000 | 00000000 | 0000F40E | 00003000 |
| msvcm80.dll | 6 | 0000F11C | 00000000 | 00000000 | 0000F63E | 000030BC |
| mscoree.dll | 1 | 0000F114 | 00000000 | 00000000 | 0000F658 | 000030B4 |

| OFTs | FTs (IAT) | Hint | Name | | | |
|---|---|---|---|---|---|---|
| Dword | Dword | Word | szAnsi | | | |
| 0000F53A | 0000F53A | 0002 | ?RegisterModuleUninitializer@<CrtImplementationDetails>@@YAXP$AAVEventHandler@@System@@@Z | | | |
| 0000F596 | 0000F596 | 0001 | ?DoDllLanguageSupportValidation@<CrtImplementationDetails>@@YAXXZ | | | |
| 0000F5DA | 0000F5DA | 0004 | ?ThrowModuleLoadException@<CrtImplementationDetails>@@YAXP$AAVString@@P$AAVException@@3@@Z | | | |
| 0000F4E8 | 0000F4E8 | 0003 | ?ThrowModuleLoadException@<CrtImplementationDetails>@@YAXP$AAVString@@System@@@Z | | | |
| 0000F48C | 0000F48C | 0005 | ?ThrowNestedModuleLoadException@<CrtImplementationDetails>@@YAXP$AAVException@@0@Z | | | |
| 0000F442 | 0000F442 | 0000 | ?DoCallBackInDefaultDomain@<CrtImplementationDetails>@@YAXP6GJPAX@Z0@Z | | | |

File: 578e1077703caf61d1db2dtf322dc47bbc61964c2f7a1b4f51*e8118577c225d
- Dos Header
- Nt Headers
  - File Header
  - Optional Header
  - Data Directories [x]
  - Section Headers [x]
- Import Directory
- Resource Directory
- Relocation Directory
- Debug Directory
- .NET Directory
  - MetaData Header
  - MetaData Streams
    - #~
      - Tables Header
      - Tables
    - #Strings
    - #US
    - #GUID
    - #Blob
- Address Converter

FIG. 3F

| Rid | Token | Offset | RVA | ImplFlags | Flags | Name | Signature | ParamList | Info |
|---|---|---|---|---|---|---|---|---|---|
| 77 | 0x0600000004D | 0x0000A182 | 0x16D9 | 0x85 | 0x6013 | 0x183C | 0xA6 | 0x40 | _security_init_cookie |
| 78 | 0x0600000004E | 0x0000A190 | 0x2A92 | 0x85 | 0x6013 | 0x1853 | 0x218 | 0x40 | Sleep |
| 79 | 0x0600000004F | 0x0000A19E | 0xB0A | 0x85 | 0x6013 | 0x1859 | 0x222 | 0x40 | <CrtImplementationDetails>.ThisModuleLoadException |
| 80 | 0x060000050 | 0x0000A1AC | 0x2AF8 | 0x85 | 0x6013 | 0x1859 | 0x22B | 0x40 | <CrtImplementationDetails>.ThisModuleLoadException |
| 81 | 0x060000051 | 0x0000A1BA | 0x2B04 | 0x85 | 0x6013 | 0x188D | 0xA6 | 0x40 | <CrtImplementationDetails>.DoDllLanguageSupportValidation |
| 82 | 0x060000052 | 0x0000A1C8 | 0x2AF2 | 0x85 | 0x6013 | 0x18C7 | 0x232 | 0x40 | <CrtImplementationDetails>.ThrowNestedModuleLoadException |
| 83 | 0x060000053 | 0x0000A1D6 | 0x2AFE | 0x85 | 0x6013 | 0x1901 | 0x23C | 0x40 | <CrtImplementationDetails>.RegisterModuleUnitializer |
| 84 | 0x060000054 | 0x0000A1E4 | 0x2AEC | 0x85 | 0x6013 | 0x1938 | 0x245 | 0x40 | <CrtImplementationDetails>.DoCallBackInDefaultDomain |
| 85 | 0x060000055 | 0x0000A1F2 | 0x2A08 | 0x85 | 0x6013 | 0x196D | 0xA6 | 0x40 | _cexit |
| 86 | 0x060000056 | 0x0000A200 | 0x2A4A | 0x85 | 0x6013 | 0x1974 | 0x258 | 0x40 | _encode_pointer |

DETECTING MICROSOFT .NET MALWARE USING MACHINE LEARNING ON .NET STRUCTURE

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 3A is an illustration of an ImplMap table of a .NET header for an example .NET file.

FIG. 3B is an illustration of a ModuleRef table of an example .NET file.

FIG. 3C is an illustration of an ImplMap table of a .NET header for an example .NET file.

FIG. 3D is an illustration of a MethodDef table for an example .NET file.

FIG. 3E is an illustration of a ModuleRef table for an example .NET file.

FIG. 3F is an illustration of an Import table for an example .NET file.

FIG. 3G is an illustration of a MethodDef table for an example .NET file.

DETAILED DESCRIPTION

Figure 1:
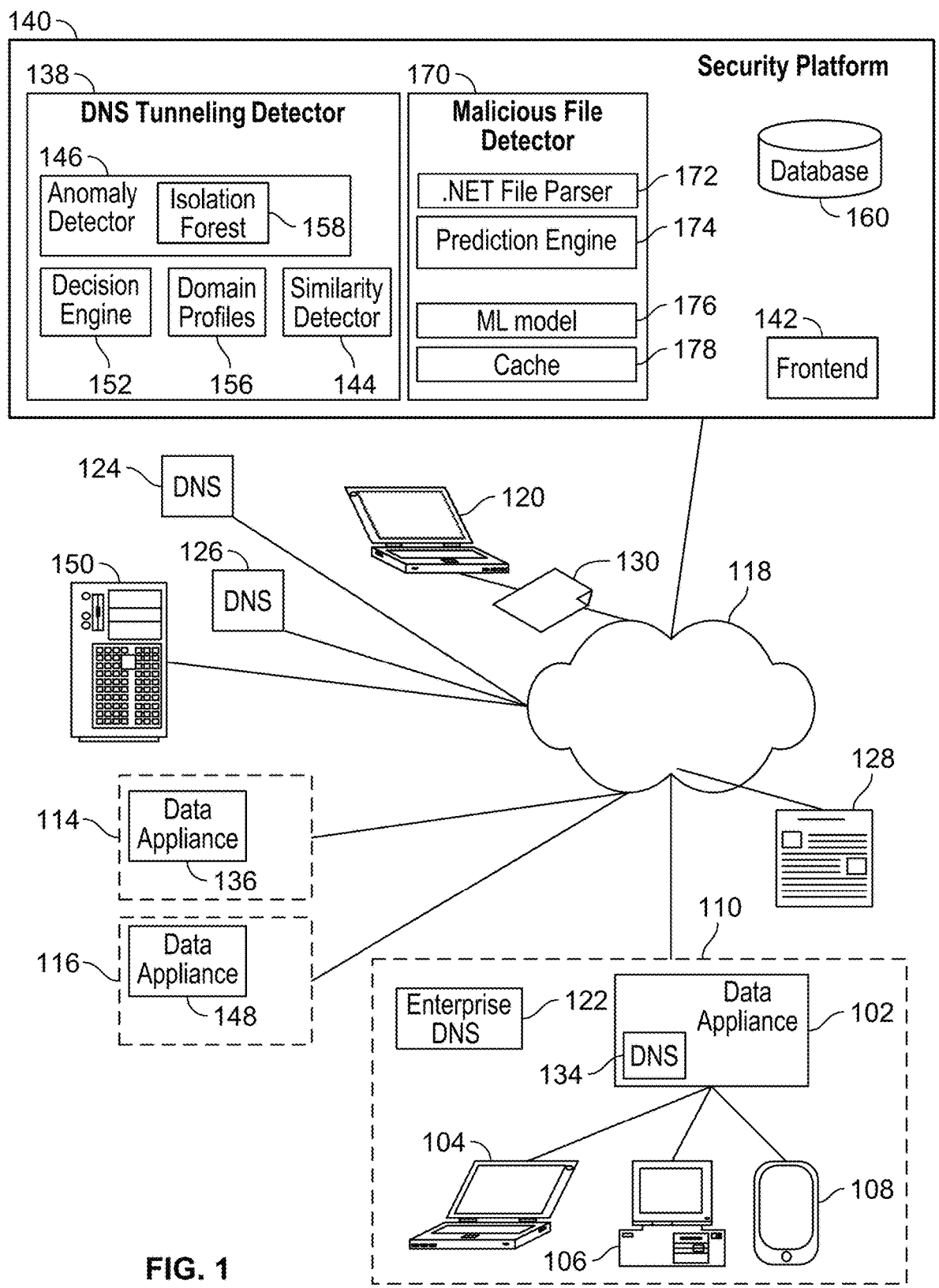
FIG. 1 is a block diagram of an environment in which a malicious file is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a feature is a measurable property or characteristic manifested in input data, which may be raw data. As an example, a feature may be a set of one or more relationships manifested in the input data. As another example, a feature may be a set of one or more relationships between maliciousness of a file (e.g., an indication of whether the file is malicious) and an attribute or information pertaining to the file, such as an attribute or information obtained from a script corresponding to the file.

As used herein, a security entity is a network node (e.g., a device) that enforces one or more security policies with respect to information such as network traffic, files, etc. As an example, a security entity may be a firewall. As another example, a security entity may be implemented as a router, a switch, a DNS resolver, a computer, a tablet, a laptop, a smartphone, etc. Various other devices may be implemented as a security entity. As another example, a security may be implemented as an application running on a device, such as an anti-malware application.

As used herein, malware refers to an application that engages in behaviors, whether clandestinely or not (and whether illegal or not), of which a user does not approve/ would not approve if fully informed. Examples of malware include trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple IOS flashlight application that stealthily collects the user's contacts and sends those contacts to a spammer. Other forms of malware can also be detected/thwarted using the techniques described herein (e.g., ransomware). Further, while malware signatures are described herein as being generated for malicious applications, techniques described herein can also be used in various embodiments to generate profiles for other kinds of applications (e.g., adware profiles, goodware profiles, etc.).

As used herein, unmanaged code or an unmanaged function refers to an imported win32 API function, as opposed to regular .NET code which is referred to as "managed code." As an example, such unmanaged code or unmanaged function is generally not reflected/comprised in the PE header of a .NET file; rather such unmanaged code or unmanaged function is imported via the .NET header of the .NET file.

According to related art, malware can be identified based on portable executable (PE) structures of files being analyzed. For example, related art systems are trained/developed-based using PE structures based on features such as imports, headers, and sections. Related art systems use such imports, headers, and sections to distinguish between malware and benign files. However, the PE file structure for Microsoft Windows PE installer-based files looks extremely similar between malicious and benign files.

Portable executable (PE) files are often coded to import functions from external libraries in order to interact with various OS components. Related art methods for detecting malware use the sequence of imports, hashes the sequence of imports to obtain a hash value, and compares the hash value against a known block-list of "Import Table Hashes" (imphash). Related art methods for detecting malware imports obtain imported API function names and corresponding library names from the PE header of a file being analyzed. However, the determining API function names and corresponding library names from the PE header and use of such API function names and corresponding library names to detect malware is not ideal for .NET files because almost all .NET PE files have similar import tables. As an example, the majority of .NET assemblies have a single imported function named "_CorExeMain" (EXE) or "_CorDllMain" (DLL) in the PE header. Generally, only a small portion of NET assemblies have more imports in the PE header. Such .NET files are generally created with Visual C++ and the C++/CLI extension. The import functions included in the PE header are generally determined by the .NET compiler and are not influenced by the code itself. This phenomenon happens because .NET code is not compiled into a native assembly, rather it is compiled into an intermediate language or intermediate bytecode (MSIL) which is then being executed by a .NET runtime.

Accordingly, the use of import functions extracted from a PE header of a .NET file does not provide an accurate detection of malware. However, various .NET malware families may still interact directly with the win32 API, for example, to inject code into other processes. Such code may be injected into other processes from .NET, but the win32 functions to do so are not reflected in the import table of the PE Header for .NET files. Rather, code injection functions are generally comprised (or imported) via a .NET header of a .NET file. The .NET header or CLR header is a header comprised in a .NET file (e.g., in addition to the PE header). For example, the .NET header is different/distinct from the PE header of the .NET file. A .NET file comprises both a PE header and a .NET header or CLR header. A .NET header or CLR header generally comprises data streams and tables including various information pertaining to the .NET assembly. One such data stream comprised in the .NET header is named "#Strings" and comprises a list of strings used in a file. The list comprised in the #Strings stream also includes the name(s) of any used unmanaged win32 API functions. Furthermore, one of the tables comprised in the .NET header is named "ImplMap" and includes various information about any imported unmanaged functions.

A system, method, and/or device for predicting or detecting a malicious file is disclosed. The system includes one or more processors and a memory coupled to the one or more processors and configured to provide the one or more processors with instructions. The one or more processors are configured to receive a sample, extract one or more characteristics from the sample and/or determine a feature corresponding to the sample, apply a classifier in connection with determining whether the sample is malicious, and in response to determining that the sample is malicious, send, to a security entity, an indication that the sample is malicious.

Various embodiments include a system and/or method for detecting malicious .NET files based at least in part on a machine learning model. In some embodiments, the system (a) receives a sample that comprises a .NET file, (b) obtains information pertaining to common language runtime (CLR) metadata and streams associated with the .NET file, (c) and determines whether the sample is malware based at least in part on (i) a classifier, and (ii) the information pertaining to the CLR metadata and stream.

Various embodiments include a system and/or method for detecting malicious .NET files based at least in part on a machine learning model. In some embodiments, the system (i) obtains a set of .NET files, (ii) performs a malicious feature extraction with respect to common language runtime (CLR) metadata and streams associated with the .NET file to obtain a set of features, and (iii) applies a machine learning process to train a model to detect malicious .NET files, the model being trained based at least in part on the set of features and information pertaining to the .NET files. In some embodiments, the model is an XGBoost model (e.g., a model trained using an XGBoost process).

According to various embodiments, the system for detecting exploits (e.g., malicious files) is implemented by one or more servers. The one or more servers may provide a service for one or more customers and/or security entities. For example, the one or more servers detect malicious files or determine/assess whether files are malicious and provide an indication of whether a file is malicious to the one or more customers and/or security entities. The one or more servers provide to a security entity the indication that a .NET file is malicious in response to a determination that the .NET file is malicious and/or in connection with an updated mapping of files to indications of whether the corresponding files are malicious (e.g., an update to a blacklist comprising identifier(s) associated with malicious files). As another example, the one or more servers determine whether a .NET file is malicious in response to a request from a customer or security for an assessment of whether a .NET file is malicious, and the one or more servers provide a result of such a determination. In some embodiments, in response to determining that a .NET file is malicious, the system updates a mapping of representative information/identifiers of files to malicious files to include a record or other indication that the .NET file is malicious. The system can provide the mapping to security entities, end points, etc.

In some embodiments, the system receives historical information pertaining to a maliciousness of a file (e.g., historical datasets of malicious exploits such as malicious files and historical datasets of benign files) from a third-party service such as VirusTotal®. The third-party service may provide a set of files (e.g., .NET files) deemed to be malicious and a set of files (e.g., .NET files) deemed to be benign. As an example, the third-party service may analyze the file and provide an indication whether a file is malicious or benign, and/or a score indicating the likelihood that the file is malicious. The system may receive (e.g., at predefined intervals, as updates are available, etc.) updates from the third-party service such as with newly identified benign or malicious files, corrections to previous misclassifications, etc. In some embodiments, an indication of whether a file in the historical datasets corresponds to a social score such as a community-based score or rating (e.g., a reputation score) indicates that a file is malicious or likely to be malicious. The system can use the historical information in connection with training the classifier (e.g., the classifier used to determine whether a .NET file is malicious). In some embodiments, the historical information is obtained based on anonymized network traffic collected by a firewall or exploit detection/prevention system. For example, the system obtains information (e.g., anonymized metadata) for a set of benign .NET files and information (e.g., anonymized metadata) for a set of malicious .NET files from network traffic. The system can use the historical information to perform a malicious feature extraction (e.g., to determine attributes/characteristics of NET files that are related to malicious files), and then perform a machine learning process based on the features and/or historical information in connection with determining the classifier.

According to various embodiments, a security entity and/or network node (e.g., a client, device, etc.) handles traffic (e.g., a .NET file, a file, etc.) based at least in part on an indication that the traffic is malicious (e.g., that the .NET file is malicious) and/or that the .NET file matches a .NET file indicated to be malicious. In response to receiving indication that the traffic (e.g., the .NET file) is malicious, the security network and/or network node may update a mapping of the .NET file to an indication of whether the corresponding .NET file is malicious, and/or a blacklist of files (e.g., a blacklist of NET files). In some embodiments, the security entity and/or the network node receives a signature pertaining to the .NET file (e.g., a sample deemed to be malicious), and the security entity and/or the network node stores the signature of the .NET file for use in connection with detecting whether .NET files obtained, such as via network traffic, are malicious (e.g., based at least in part on comparing a signature generated for the .NET file with a signature for a file comprised in a blacklist of .NET files). As an example, the signature may be a hash. A security entity can detect malicious files obtained via network traffic by determining a signature or identifier associated with a .NET file (e.g., a hash, a signature, etc.) and perform a query with respect to a blacklist of files, a whitelist of files, etc.

According to various embodiments, the system for detecting a malicious file is implemented by a security entity. For example, the system for detecting a malicious file is implemented by a firewall. As another example, the system for detecting the malicious file is implemented by an application such as an anti-malware application running on a device (e.g., a computer, laptop, mobile phone, etc.). According to various embodiments, the security entity receives a .NET file, obtains information pertaining to the .NET file (e.g., a feature vector, a combined feature vector, one or more characteristics associated with the .NET file such as comprised in a .NET header of the .NET file, etc.), and determines whether the .NET file is malicious based at least in part on the .NET file. As an example, the system determines one or more feature vectors (e.g., a combined feature vector) corresponding to the .NET file, and uses a classifier to determine whether the .NET file is malicious based at least in part on the one or more feature vectors. In response to determining that the .NET file is malicious, the security entity applies one or more security policies with respect to the .NET file. In response to determining that the .NET file is not malicious (e.g., that the .NET file is benign), the security entity handles the .NET file as non-malicious traffic. In some embodiments, in response to determining that the .NET file is malicious, the security entity updates a blacklist of files to include an indication that the .NET file is malicious. For example, the security entity provides the update of the blacklist of files or an indication that the .NET file is malicious to a server (e.g., a server that provides an exploit detection or prevention service, etc.).

In some embodiments, the system obtains (e.g., determines) a classifier (e.g., a model trained using a machine learning process) to detect malicious .NET files or otherwise determines whether a .NET file is malicious. The obtaining the classifier can include determining one or more features with which to train the classifier, such as by performing a malicious feature extraction with respect to historical information (e.g., information for a set of benign .NET files and information for a set of malicious .NET files from network traffic) or based on a predefined set of features. According to various embodiments, the one or more features include features pertaining to one or more of (i) keywords, (ii) a behavior of a signer, (iii) one or more metadata tables, (iv) a metadata header, (v) a CLR header, (vi) one or more unmanaged methods and/or modules, (vii) methods implemented/invoked by the .NET file, and (viii) resources implemented/invoked by the .NET file. Various other types of information can be used in connection with determining a feature to be used in connection with the one or more features, such as information pertaining to a PE optional header, and/or PE section sizes, and/or information indicating whether an address space layout randomization (ASLR) or data execution prevention (DEP) is enabled (e.g., in the PE). As an example, the one or more features include a feature pertaining to a count of functions referenced (e.g., invoked) by the CLR data or CLR header. As another example, the one or more features include a feature pertaining to values of fields of the CLR data or CLR header. As another example, the one or more features include a feature pertaining to abnormal values of fields of the CLR data or CLR header. As another example, the one or more features include a feature pertaining to a count of resources referenced (e.g., invoked) by the CLR data or CLR header. As another example, the one or more features include a feature pertaining to a count of streams comprised in the .NET file (e.g., the CLR data or CLR header). As another example, the one or more features include a feature pertaining to a count of functions comprised in (e.g., invoked by) the .NET file. The one or more features used in connection with training the classifier are based at least in part on a set of predefined features, such as features manually set by an administrator. As an example, the classifier is trained using the set of predefined features and no features obtained based on a malicious feature extraction process (e.g., an algorithmic determined feature). As another example, the classifier is trained using the set of predefined features and features obtained based on a malicious feature extraction process.

According to various embodiments, the model for detecting exploit traffic is obtained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. Inputs to the classifier (e.g., the XGBoost machine learning classifier model) are a combined feature vector or set of one or more feature vectors, and based on the combined feature vector or set of feature vectors, the classifier model determines whether the corresponding traffic (e.g., the .NET file(s)) is malicious, or a likelihood that the traffic is malicious (e.g., whether the traffic is exploit traffic such as comprising a malicious .NET file).

According to various embodiments, the model is trained using an XGBoost machine learning process. In some implementations, a model trained using an XGBoost machine learning process is preferred because such a model is easy to migrate simple-version regex to prefilter patterns supported by security entities (e.g., firewalls, etc.).

In some embodiments, the system obtains samples of NET files, the system extracts a feature vector(s) based on a library (e.g., of features), the system returns a response comprising the feature vector or file path at which the feature vector is obtainable, the system obtains content pertaining to the feature vector, the system queries the classifier to classify the .NET file using the feature vector (e.g., the system sends a request to a machine learning service), the classifier saves the feature vector and predicts a maliciousness (e.g., based on the feature vector), and the system saves information pertaining to a prediction of whether the .NET file is malicious.

In some embodiments, the system determines whether the file is malicious based at least in part on determining (e.g., obtaining) imported API function names based at least in part on a .NET header of the .NET file, determining one or more features based at least in part on the unmanaged imported API function names, and using a classifier to determine whether the .NET file is malicious based at least in part on the one or more features.

Various embodiments parse a .NET header of a .NET file, extract unmanaged imports (e.g., unmanaged functions, libraries, etc.) from one or more fields in the .NET header, and determine whether the .NET file is malicious based at least in part on the extracted unmanaged imports. In some embodiments, a system determines a list of unmanaged imports corresponding to a .NET file (e.g., extracted from a field(s) in the .NET header), and determines (e.g., computes) a hash of the list of unmanaged imports. The hash of the list of unmanaged imports may be determined based on a predefined hashing function. Examples of the hashing function include an SHA-256 hashing function, an MD5 hashing function, an SHA-1 hashing function, etc. Various other hashing functions may be implemented. As used herein, Unmanaged Imphash refers to a value obtained by determining a hash of the list of unmanaged imports (e.g., the unmanaged imports extracted from a field(s) in the .NET header).

According to various embodiments, information comprised in the .NET header of a .NET file is used in connection with determining whether a file is malicious. In some embodiments, the system uses information comprised in the ImplMap table and information comprised in the strings of the "#Strings" data stream to determine a set of unmanaged function <-> library name pairs. The system may determine a list pertaining to the unmanaged imported functions of the .NET file (e.g., imported via the .NET header). In some embodiments, the system determines a hash of the list pertaining to the unmanaged imported functions of the .NET file. For example, the system determines an Unmanaged Imphash corresponding to the .NET file. The Unmanaged Imphash may be used to determine whether the file is malicious. For example, the system may query a list of files deemed to be malicious (e.g., a blacklist) to determine whether the list comprises a record having an Unmanaged Imphash matching the Unmanaged Imphash determined for the .NET file.

According to various embodiments, the system analyzes the .NET file in a sandbox environment. For example, the system parses the .NET file and extracts information from the .NET header within a sandbox environment. The system may be implemented by a virtual machine (VM) operating in a sandbox environment.

In some embodiments, the system receives historical information pertaining to a maliciousness of a file (e.g., historical datasets of malicious files and historical datasets of benign files) from a third party service such as VirusTotal®. The third party service may provide a set of files deemed to be malicious and a set of files deemed to be benign. As an example, the third party service may analyze the file and provide an indication whether a file is malicious or benign, and/or a score indicating the likelihood that the file is malicious. The third party service may provide Unmanaged Imphashes corresponding to the files comprised in the historical dataset (e.g., a blacklist of files, a whitelist of files, etc.), or the list may comprise indications of whether historical Unmanaged Imphashes are malicious. The system may receive (e.g., at predefined intervals, as updates are available, etc.) updates from the third party service such as with newly identified benign or malicious files, corrections to previous mis-classifications, etc. In some embodiments, an indication of whether a file in the historical datasets corresponds to a social score such as a community-based score or rating (e.g., a reputation score) indicates that a file is malicious or likely to be malicious.

According to various embodiments, a security entity and/or network node (e.g., a client, device, etc.) handles a file based at least in part on an indication that the file is malicious and/or that the file matches a file indicated to be malicious. In response to receiving indication that the file (e.g., the sample) is malicious, the security network and/or network node may update a mapping of files to an indication of whether the corresponding file is malicious, and/or a blacklist of files. In some embodiments, the security entity and/or the network node receives a signature pertaining to a file (e.g., a sample deemed to be malicious), and the security entity and/or the network node stores the signature of the file for use in connection with detecting whether files obtained, such as via network traffic, are malicious (e.g., based at least in part on comparing a signature generated for the file with a signature for a file comprised in a blacklist of files). As an example, the signature may be a hash. In some embodiments, the signature for the file is the Unmanaged Imphash corresponding to such file.

Firewalls typically deny or permit network transmission based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

The system improves detection of malicious .NET files. Further, the system further improves the handling of network traffic by preventing (or improving prevention of) malicious .NET files being across a network such as among nodes within a network, or preventing malicious files .NET from entering a network. The system determines .NET files that are deemed to be malicious or likely to be malicious such as based on a .NET header of the .NET file. Related art detection techniques that use a structure of PE header for a file may be insufficient/inaccurate with respect to files having similar structures/profiles among malicious or benign files. Further, because .NET files are compiled into an intermediate language, classifying files as malicious/benign is difficult using machine learning classifiers or manually written YARA rules. YARA is a tool aimed at (but not limited to) helping malware researchers to identify and classify malware samples. YARA rules are used to classify and identify malware samples by creating descriptions of malware families based on textual or binary patterns. Further, the system can provide accurate and low latency updates to security entities (e.g., endpoints, firewalls, etc.) to enforce one or more security policies (e.g., predetermined and/or customer-specific security policies) with respect to traffic comprising malicious files (e.g., malicious .NET files). Accordingly, the system prevents proliferation of malicious traffic (e.g., files) to nodes within a network.

Examples of .NET malware that is detected using systems and methods according to various embodiments include (a) 32-bit EXE downloader of the Gamaredon threat actor toolset (e.g., 53be28a251260e4f6d818a0dcae30280b5db6f-1791780bb9bac0633523bf3ac3); (b) a 32-bit DLL plugin for a trojan named "S-400 RAT" (e.g., e7141919938-ade00145db46e91629e031c23cf37d4872005bd75205ad15-7f2d0); (c) a 32-bit EXE downloader for a password stealer payload downloaded from Github, and for which stolen data is sent to a telegram channel (e.g., 4eeb53b7fdf4ec34583-ae999099a84a1b0ef10629afff0c617af70e37683ce70), (d) a 32-bit DLL virus that tries to infect USB drives (e.g., 8159bbaa5c9bdc56f6ebd42b3408eba74690279d3e6d8ee3-24fb4a4777a09207), and (e) an obfuscated 32-bit EXE downloader for a payload hosted on Discord (e.g., f82833c0b03e45b3b7211d7033596fb8aaa357eef27848fd8-14449899dadc4d6)

FIG. 1 is a block diagram of an environment in which a malicious file is detected or suspected according to various embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, .NET files, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of files to indications of whether the file is malicious or benign), providing a likelihood that an input string or file (e.g., a .NET file) is malicious or benign, providing/updating a whitelist of input strings or files deemed to be benign, providing/updating input strings or files deemed to be malicious, identifying malicious domains, detecting malicious input strings, detecting malicious files, predicting whether an input string or file (e.g., a .NET file) is malicious, and providing an indication that an input string or file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

In some embodiments, system 100 (e.g., malicious file detector 170, security platform 140, etc.) trains a model to detect exploits (e.g., malicious .NET files). The system 100 determines a set of features to be used in connection with training a classifier (e.g., a model trained using a machine learning process). The set of features may comprise one or more features that are predefined (e.g., set by an administrator, etc.), one or more features determined based on a malicious feature extraction (e.g., an algorithmic process for detecting features associated with maliciousness), etc., or any permutation or combination thereof. The system generates a set of feature vectors for training a machine learning model for detecting malicious .NET files. The system then uses the set of feature vectors (or a combined feature vector) to train a machine learning model such as based on training data that includes one or more of malicious traffic (e.g., information pertaining to .NET files that are deemed malicious) and benign traffic (e.g., information pertaining to .NET files that are deemed benign). According to various embodiments, one or more features can be based at least in part on information comprised in (e.g., obtained from) the CLR metadata and/or CLR header of a .NET file.

Examples of a feature determined based on the CLR metadata or CLR header of a file are comprised in the one or more features to one or more of (a) a major version for a CLR metadata header, (b) a minor version for a CLR metadata header, (c) a header flag for a CLR metadata header, (d) an abnormal reserved value for CLR metadata header, (e) an abnormal signature value for CLR metadata header, (f) a version length for the CLR metadata, (g) a number of streams for CLR metadata header, (h) a major version for CLR header, (i) a minor version for CLR header, (j) an indication of whether the CLR header flag is enabled, (k) a version length for CLR header, (l) an indication of whether a resources directory address is present, (m) an indication of whether a strong name signature address is present, (n) an indication of whether a code manager table address is present, (o) an indication of whether an ExportAddress TableJumps is present, (p) an indication of whether a virtual table fix up address is present, (q) an indication of whether a managed native header is present, (r) an indication whether a flag value is abnormal, (s) an indication of whether the .NET entry point is comprised in the method definition table, (t) an indication of whether the .NET entry point is comprised in an external file, (u) an indication that no .NET entry point is defined, (v) an indication of whether the value for an entry point token is abnormal, (w) an indication of whether a table is present, (x) a number of entries in the table, (y) an indication of whether the name field is comprised in the assembly table, (z) an indication that the culture (e.g., language) field is comprised in the assembly table, (aa) a number of external assemblies referenced, (ab) a number of virtual values referenced in the external assemblies, (ac) an indication of whether the module table has a name field, (ad) an indication of whether the user strings have non-ASCII characters, (ae) an indication of whether the system strings have non-ASCII characters, (af) an average length of user strings, (ag) an average length of system strings, (ah) a count if a particular keyword(s) is comprised in the user and/or system strings, (ai) a count of unmanaged functions, (aj) a count of unmanaged modules, (ak) a count of events, (al) an indication of whether the metadata table has extra data, (am) hidden data directors, (an) invalid type references, (ao) self referencing type references, (ap) a count of type of references, (aq) a count of resources, (ar) a total size of resources, (as) a count of publicly visible resources, (at) a count of privately visible resources, (au) an indication that the .NET file is a mixed assembly, (av) an indication that the .NET file has a native entry point, (aw) an indication that the .NET file is a native image, (ax) a count of methods, and (ay) a count of methods with non-ASCII characters. Various combinations of the foregoing features (and optionally, one or more other features based on information obtained outside the CLR metadata or CLR header, etc.) may be implemented in connection with training/using the classifier.

According to various embodiments, the one or more features used in connection with predicting maliciousness of NET files further comprise features that are based on information comprised in the PE header (e.g., whether the file is a .DLL file, whether the ASLR is enabled, whether the DEP is enabled, etc.), the PE optional header, and/or PE sections.

According to various embodiments, security platform 140 comprises DNS tunneling detector 138 and/or malicious file detector 170. Malicious file detector 170 is used in connection with determining whether a .NET file is malicious. In response to receiving a sample (e.g., a .NET file), malicious file detector 170 analyzes the .NET file, and determines whether the sample is malicious. For example, malicious file detector 170 determines one or more feature vectors for the .NET file (e.g., a combined feature vector), and uses a model to determine (e.g., predict) whether the .NET file is malicious. The malicious file detector 170 determines whether the .NET file is malicious based at least in part on one or more attributes of the .NET file. In some embodiments, malicious file detector 170 receives a .NET file, performs a feature extraction (e.g., a feature extraction with respect to one or more attributes of the .NET file), and determines (e.g., predicts) whether the .NET file is malicious based at least in part on the feature extraction results. For example, malicious file detector 170 uses a classifier to determine (e.g., predict) whether the .NET file is malicious based at least in part on the feature extraction results. In some embodiments, the classifier corresponds to a model to determine whether a .NET file is malicious, and the model is trained using a machine learning process.

In some embodiments, malicious file detector 170 comprises one or more of .NET file parser 172, prediction engine 174, ML model 176, and/or cache 178.

.NET file parser 172 is used in connection with obtaining information pertaining to the sample such as a .NET file. In some embodiments, .NET file parser 172 obtains a CLR header and/or CLR metadata. As an example, .NET file parser 172 obtains a .NET header and/or information from the .NET header of the .NET file. The .NET file parser 172 obtains one or more data streams comprised in the .NET header and/or one or more tables comprised in (or referenced by) the .NET header. For example, the .NET file parser 172 obtains the #Strings stream comprised in the .NET header. As another example, the .NET file parser 172 obtains the ImplMap from the .NET file (e.g., from the .NET header). In some embodiments, the .NET file parser 172 determines a set of imported functions (e.g., imported API function names) that are imported to the .NET file.

In some embodiments, one or more feature vectors corresponding to the .NET file are determined by malicious file detector 170 (e.g., .NET file parser 172 or prediction engine 174). For example, the one or more feature vectors are determined (e.g., populated) based at least in part on the one or more attributes or sets of alphanumeric characters or values associated with the .NET file (e.g., attributes obtained based on information comprised in the corresponding CLR metadata and/or CLR header). As an example, .NET file parser 172 uses the one or more attributes associated with the .NET file in connection with determining the one or more feature vectors. In some implementations, .NET file parser 172 determines a combined feature vector based at least in part on the one or more feature vectors corresponding to the .NET file. As an example, a set of one or more feature vectors is determined (e.g., set or defined) based at least in part on the model used to detect exploits. The malicious file detector 170 can use the set of one or more features to determine the one or more attributes or patterns to determine (e.g., populate, etc.) the feature vectors. The model is trained using a set of features that are obtained based at least in part on sample malicious traffic. The model may be trained based on a set of features corresponding to a predefined set of features (e.g., manually defined feature(s), predefined regex statements, etc.) and/or a set of feature vectors determined based on an algorithmic-based feature extraction. For example, the model is determined based at least in part on performing a malicious feature extraction in connection with generating (e.g., training) a model to detect exploits.

In response to receiving the .NET file for which malicious file detector 170 is to determine whether the .NET file is malicious (or a likelihood that the .NET file is malicious), malicious file detector 170 determines the one or more feature vectors corresponding to the .NET file. As an example, in response to determining (e.g., obtaining) the one or more feature vectors, malicious file detector 170 (e.g., .NET file parser 172) provides (or makes accessible) the one or more feature vectors to prediction engine 174 (e.g., in connection with obtaining a prediction of whether the .NET file is malicious). As another example, malicious file detector 170 (e.g., .NET file parser 172) stores the one or more feature vectors such as in cache 178 or database 160.

In some embodiments, prediction engine 174 determines whether the .NET is malicious (e.g., provides a prediction/likelihood of whether the file is malicious) based at least in part on one or more of (i) a mapping of NET files to indications of whether the corresponding .NET files are malicious, (ii) a mapping of an identifier for a .NET file (e.g., a hash or other signature associated with the .Net file) to indications of whether the corresponding .NET files are malicious, and/or (iii) a classifier (e.g., a model trained using a machine learning process).

Prediction engine 174 is used to predict whether a .NET file is malicious. In some embodiments, prediction engine 174 determines (e.g., predicts) whether a received .NET file is malicious. According to various embodiments, prediction engine 174 determines whether a .NET file is malicious based at least in part on the registration information. For example, prediction engine 174 applies a machine learning model to determine whether the .NET file is malicious. Applying the machine learning model to determine whether the .NET file is malicious may include prediction engine 174 querying machine learning model 176 (e.g., with information pertaining to the .NET file, one or more feature vectors, etc.). In some implementations, machine learning model 176 is pre-trained and prediction engine 174 does not need to provide a set of training data (e.g., information pertaining to sample malicious .NET files or and/or sample benign .NET files) to machine learning model 176 contemporaneous with a query for an indication/determination of whether a particular .NET file is malicious. In some embodiments, prediction engine 174 receives information associated with whether the .NET file is malicious (e.g., an indication that the .NET file is malicious). For example, prediction engine 174 receives a result of a determination or analysis by machine learning model 176. In some embodiments, prediction engine 174 receives, from machine learning model 176, an indication of a likelihood that the .NET file is malicious. In response to receiving the indication of the likelihood that the .NET file is malicious, prediction engine 174 determines (e.g., predicts) whether the .NET file is malicious based at least in part on the likelihood that the .NET file is malicious. For example, prediction engine 174 compares the likelihood that the .NET file is malicious to a likelihood threshold value. In response to a determination that the likelihood that the .NET file is malicious is greater than a likelihood threshold value, prediction engine 174 may deem (e.g., determine that) the .NET file to be malicious.

According to various embodiments, in response to prediction engine 174 determining that the received .NET file is malicious, the system sends to a security entity an indication that the .NET file is malicious. For example, malicious file detector 170 may send to a security entity (e.g., a firewall) or network node (e.g., a client) an indication that the .NET file is malicious. The indication that the .NET file is malicious may correspond to an update to a blacklist of NET files (e.g., corresponding to malicious .NET files) such as in the case that the received .NET file is deemed to be malicious, or an update to a whitelist of .NET files (e.g., corresponding to non-malicious .NET files) such as in the case that the received .NET file is deemed to be benign. In some embodiments, malicious file detector 170 sends a hash or signature corresponding to the .NET file in connection with the indication that the .NET file is malicious or benign. The security entity or endpoint may compute a hash or signature for a .NET file and perform a lookup against a mapping of hashes/signatures to indications of whether .NET files are malicious/benign (e.g., query a whitelist and/or a blacklist). In some embodiments, the hash or signature uniquely identifies the .NET file.

Prediction engine 174 is used in connection with determining whether the .NET file is malicious (e.g., determining a likelihood or prediction of whether the .NET file is malicious). Prediction engine 174 uses information pertaining to the .NET file (e.g., one or more attributes, patterns, etc.) in connection with determining whether the corresponding .NET file is malicious.

Prediction engine 174 is used to determine whether the .NET file is malicious. Prediction engine 174 uses information pertaining to the .NET file (e.g., structural features of the .NET file determined based on an analysis of the .NET file, such as information obtained from the .NET header of the .NET file) in connection with determining whether the corresponding .NET file is malicious. In some embodiments, prediction engine 174 determines a set of one or more feature vectors based at least in part on information pertaining to the .NET file. For example, prediction engine 174 determines feature vectors for (e.g., characterizing) the .NET file. In some embodiments, prediction engine 174 uses a combined feature vector in connection with determining whether a .NET file is malicious. The combined feature vector is determined based at least in part on the set of one or more feature vectors. For example, the combined feature vector is determined based at least in part on a set of feature vectors for the predefined set of regex statements, and a set of feature vectors for the characteristics or relationships determined based on an algorithmic-based feature extraction. In some embodiments, prediction engine 174 determines the combined feature vector by concatenating the set of feature vectors for the predefined set of features and/or the set of feature vectors for the features determined based on an algorithmic-based feature extraction. Prediction engine 174 obtains the combined feature vector based on concatenating the set of feature vectors according to a predefined process (e.g., predefined order, etc.).

In response to determining the set of feature vectors or combined feature vector, prediction engine 174 uses a classifier to determine whether the .NET file is malicious (or a likelihood that the file is malicious). The classifier is used to determine whether the .NET file is malicious based at least in part on the set of feature vectors or the combined feature vector. In some embodiments, the classifier is a machine learning classifier, such as a classifier that is trained using a machine learning process. Prediction engine 174 uses a result of analyzing the set of feature vectors or the combined feature vector with the classifier to determine whether the .NET file is malicious. In some embodiments, the classifier corresponds to machine learning model 176.

According to various embodiments, prediction engine 174 uses the set of feature vectors obtained based on a dynamic analysis of the file to determine whether the file is malicious. In some embodiments, prediction engine 174 uses the combined feature vector in connection with determining whether the .NET file is malicious. As an example, in response to determining the corresponding feature vector(s), prediction engine 174 uses a classifier to determine whether the .NET file is malicious (or a likelihood that the .NET file is malicious). In some embodiments, if a result of analyzing the feature vector(s) (e.g., the combined feature vector) using the classifier is less than a predefined threshold (e.g., a predefined maliciousness threshold), the system deems (e.g., determines) that the .NET file is not malicious (e.g., the .NET file is benign). For example, if the result from analyzing the feature vector(s) indicates a likelihood of whether the .NET file is malicious, then the predefined threshold can correspond to a threshold likelihood. As another example, if the result from analyzing the feature vector(s) indicates a degree of similarity of the .NET file to a malicious .NET file, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the .NET file is malicious (e.g., the .NET file is an exploit).

In response to receiving a .NET file to be analyzed, malicious file detector 170 can determine whether the .NET file corresponds to a previously analyzed .NET file (e.g., whether the .NET file matches a .NET file associated with historical information for which a maliciousness determination has been previously computed). As an example, malicious file detector 170 determines whether an identifier or representative information corresponding to the .NET file is comprised in the historical information (e.g., a blacklist, a whitelist, etc.). In some embodiments, representative information corresponding to the .NET file is a hash or signature of the .NET file. In some embodiments, malicious file detector 170 (e.g., prediction engine 174) determines whether information pertaining to a particular .NET file is comprised in a dataset of historical .NET files and/or historical information associated with the historical dataset indicating whether a particular .NET file is malicious (e.g., a third-party service such as VirusTotal™). In response to determining that information pertaining to a particular .NET file is not comprised in, or available in, the dataset of historical .NET files and/or historical information, malicious file detector 170 may deem that the .NET file has not yet been analyzed and malicious file detector 170 can invoke an analysis of the .NET file in connection with determining (e.g., predicting) whether the .NET file is malicious (e.g., malicious file detector 170 can query a classifier based on the .NET file in connection with determining whether the .NET file is malicious). An example of the historical information associated with the historical files indicating whether a particular .NET file is malicious corresponds to a Virus-Total® (VT) score. In the case of a VT score greater than 0 for a particular .NET file, the particular .NET file is deemed malicious by the third-party service. In some embodiments, the historical information associated with the historical NET files indicating whether a particular .NET file is malicious corresponds to a social score such as a community-based score or rating (e.g., a reputation score) indicating that a .NET file is malicious or likely to be malicious. The historical information (e.g., from a third-party service, a community-based score, etc.) indicates whether other vendors or cyber security organizations deem the particular .NET file to be malicious.

In some embodiments, malicious file detector 170 (e.g., prediction engine 174) determines that a received file is newly analyzed (e.g., that the .NET file is not within the historical information/dataset, is not on a whitelist or blacklist, etc.). Malicious file detector 170 (e.g., .NET file parser 172) may detect that a .NET file is newly analyzed in response to security platform 140 receiving the .NET file from a security entity (e.g., a firewall) or endpoint within a network. For example, malicious file detector 170 determines whether a .NET file is newly analyzed contemporaneous with the .NET file being received by the security platform 140 or malicious file detector 170. As another example, malicious file detector 170 (e.g., prediction engine 174) determines that a .NET file is newly analyzed according to a predefined schedule (e.g., daily, weekly, monthly, etc.), such as in connection with a batch process. In response to determining that a .NET file that is received that has not yet been analyzed with respect to whether such .NET file is malicious (e.g., the system does not comprise historical information with respect to such .NET file), malicious file detector 170 determines whether to use a dynamic analysis of the .NET file (e.g., to query a classifier to analyze the .NET file or one or more feature vectors associated with the .NET file, etc.) in connection with determining whether the .NET file is malicious, and malicious file detector 170 uses a classifier with respect to a set of feature vectors or a combined feature vector associated with characteristics or relationships of attributes or characteristics in the .NET file.

Machine learning model 176 predicts whether a .NET file (e.g., a newly received .NET file) is malicious based at least in part on a model. As an example, the model is pre-stored and/or pre-trained. The model can be trained using various machine learning processes. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DB-SCAN) clustering, principal component analysis, etc. According to various embodiments, machine learning model 176 uses a relationship and/or pattern of attributes, characteristics, and/or relationships among attributes or characteristics for the .NET file (e.g., based on information obtained from the CLR metadata or CLR header of the .NET file) and/or a training set to estimate whether the .NET file is malicious, such as to predict a likelihood that the .NET file is malicious. For example, machine learning model 176 uses a machine learning process to analyze a set of relationships between an indication of whether a .NET file is malicious (or benign) and one or more attributes pertaining to the .NET file, and uses the set of relationships to generate a prediction model for predicting whether a particular .NET file is malicious. In some embodiments, in response to predicting that a particular .NET file is malicious, an association between the .NET file and the indication that the .NET file is malicious is stored such as at malicious file detector 170 (e.g., cache 178). In some embodiments, in response to predicting a likelihood that a particular .NET file is malicious, an association between the .NET file and the likelihood that the .NET file is malicious is stored such as at malicious file detector 170 (e.g., cache 178). Machine learning model 176 may provide the indication of whether a .NET file is malicious, or a likelihood that the .NET file is malicious, to prediction engine 174. In some implementations, machine learning model 176 provides prediction engine 174 with an indication that the analysis by machine learning model 176 is complete and that the corresponding result (e.g., the prediction result) is stored in cache 178.

According to various embodiments, machine learning model 176 uses one or more features in connection with predicting whether a .NET file is malicious (or a likelihood that a .NET file is malicious). For example, machine learning model 176 may be trained using one or more features. In some embodiments, the feature(s) are determined based on information obtained at least from CLR metadata and/or CLR headers of NET files. Various other features may be implemented in connection with training and/or applying the model. In some embodiments, a set of features is used to train and/or apply the model. Weightings may be used to weight the respective features in the set of features used to train and/or apply the model. The weightings may be determined based at least in part on the generating (e.g., determining) the model.

Cache 178 stores information pertaining to a .NET file. In some embodiments, cache 178 stores mappings of indications of whether a .NET file is malicious (or likely malicious) to particular .NET files, or mappings of indications of whether a .NET file is malicious (or likely malicious) to hashes or signatures corresponding to .NET files. Cache 178 may store additional information pertaining to a set of .NET files such as attributes of the .NET file, hashes or signatures corresponding to the .NET file in the set of .NET files, other unique identifiers corresponding to a .NET file in the set of .NET files, etc.

Returning to FIG. 1, suppose that a malicious individual (using client device 120) has created malware 130 (e.g., a malicious .NET file). The malicious individual hopes that a client device, such as client device 104, will execute a copy of malware or other exploit (e.g., malicious .NET file) 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140), and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to open a .NET file that was received, such as via an attachment to an email, instant message, or otherwise exchanged via a network, or when a client device receives such a .NET file, DNS module 134 uses the .NET file (or a computed hash or signature, or other unique identifier, etc.) as a query to security platform 140. This query can be performed contemporaneously with receipt of the .NET file, or in response to a request from a user to scan the .NET file. As one example, data appliance 102 can send a query (e.g., in the JSON format) to a frontend 142 of security platform 140 via a REST API. Using processing described in more detail below, security platform 140 will determine (e.g., using a malicious file detector that may be similar to malicious file detector 170 such as by using a machine learning model to detect/predict whether the file is malicious) whether the queried file is a malicious file (or likely to be a malicious file) and provide a result back to data appliance 102 (e.g., "malicious file" or "benign file").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides the DNS queries to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]). Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), such DNS patterns are highly unlikely to be misclassified as malicious tunneling. The following are example characteristics that can be extracted as features (e.g., into a feature vector) for a given group of domains (i.e., sharing a root domain).

In some embodiments, malicious file detector 170 provides to a security entity, such as data appliance 102, an indication whether a .NET file is malicious. For example, in response to determining that the .NET file is malicious, malicious file detector 170 sends an indication that the .NET file is malicious to data appliance 102, and the data appliance may in turn enforce one or more security policies based at least in part on the indication that the .NET file is malicious. The one or more security policies may include isolating/quarantining the .NET file, deleting the .NET file, ensuring that the .NET file is not executed or resolved, alerting or prompting the user of the maliciousness of the .NET file prior to the user opening/executing the .NET file, etc. As another example, in response to determining that the .NET file is malicious, malicious file detector 170 provides to the security entity an update of a mapping of NET files (or hashes, signatures, or other unique identifiers corresponding to .NET files) to indications of whether a corresponding .NET file is malicious, or an update to a blacklist for malicious .NET files (e.g., identifying malicious .NET files) or a whitelist for benign .NET files (e.g., identifying .NET files that are not deemed malicious).

Figure 2:
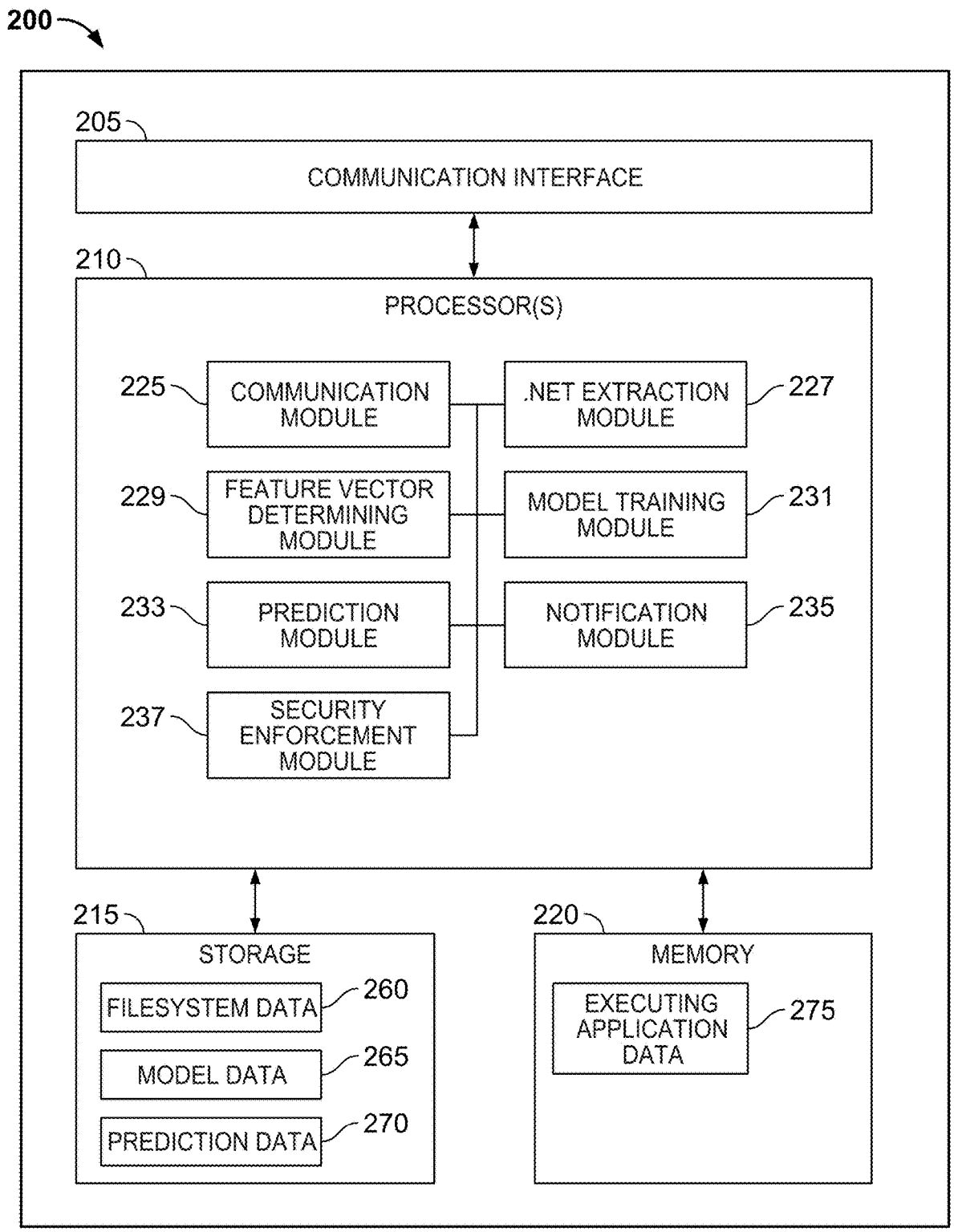
FIG. 2 is a block diagram of a system to detect a malicious file according to various embodiments.

FIG. 2 is a block diagram of a system to detect a malicious file according to various embodiments. According to various embodiments, system 200 is implemented in connection with system 100 of FIG. 1, such as for malicious file detector 170. In various embodiments, system 200 is implemented in connection with process 400 of FIG. 4, process 500 of FIG. 5, process 600 of FIG. 6, process 700 of FIG. 7, process 800 of FIG. 8, process 900 of FIG. 9, process 1000 of FIG. 10, and/or process 1100 of FIG. 11. System 200 may be implemented in one or more servers, a security entity such as a firewall, and/or an endpoint.

System 200 can be implemented by one or more devices such as servers. System 200 can be implemented at various locations on a network. In some embodiments, system 200 implements malicious file detector 170 of system 100 of FIG. 1. As an example, system 200 is deployed as a service, such as a web service (e.g., system 200 determines whether a .NET file is malicious, and provides such determinations as a service). The service may be provided by one or more servers (e.g., system 200 or the malicious file detector is deployed on a remote server that monitors or receives .NET files that are transmitted within or into/out of a network such as via inputs to a web interface such as a login screen, an authentication interface, a query interface, etc., or attachments to emails, instant messages, etc., and determines whether a .NET file is malicious, and sends/pushes out notifications or updates pertaining to the .NET file such as an indication whether a .NET file is malicious). As another example, the malicious file detector is deployed on a firewall.

According to various embodiments, in response to receiving the .NET file to be analyzed to determine whether the .NET file is malicious, system 200 uses a classifier to determine whether the .NET file is malicious (or to determine a likelihood that the .NET file is malicious). For example, system 200 uses the classifier to provide a prediction of whether the .NET file is malicious. In some embodiments, system 200 determines one or more feature vectors corresponding to the .NET file and uses the classifier to analyze the one or more feature vectors in connection with determining whether the .NET file is malicious.

In some embodiments, system 200 (i) receives a .NET file, (ii) performs a feature extraction (e.g., determines one or more feature vectors for the .NET file), and (iii) uses a classifier to determine whether the .NET file is malicious based at least in part on the feature extraction results.

In the example shown, system 200 implements one or more modules in connection with predicting whether a .NET file (e.g., a newly received .NET file) is malicious, determining a likelihood that the .NET file is malicious, and/or providing a notice or indication of whether a .NET file is malicious. System 200 comprises communication interface 205, one or more processors 210, storage 215, and/or memory 220. One or more processors 210 comprises one or more of communication module 225, .NET extraction module 227, feature vector determining module 229, model training module 231, prediction module 233, notification module 235, and security enforcement module 237.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive a .NET file(s) to be analyzed, such as from network endpoints or nodes such as security entities (e.g., firewalls), database systems, query systems, etc. Communication module 225 is configured to query third party service(s) for information pertaining to .NET files (e.g., services that expose information for .NET files such as third party scores or assessments of maliciousness of .NET files, a community-based score, assessment, or reputation pertaining to .NET files, a blacklist for .NET files, and/or a whitelist for .NET files, etc.). For example, system 200 uses communication module 225 to query the third-party service(s). Communication module 225 is configured to receive one or more settings or configurations from an administrator. Examples of the one or more settings or configurations include configurations of a process determining whether a .NET file is malicious, a format or process according to which a combined feature vector is to be determined, a set of feature vectors to be provided to a classifier for determining whether the .NET file is malicious, a set of features that are defined by a user (e.g., manually defined by an administrator, etc.), a configuration pertaining to sample traffic (e.g., benign files or malicious files) to be used in connection with the generating of training the classifier, information pertaining to a whitelist of NET files (e.g., .NET files that are not deemed suspicious and for which traffic or attachments are permitted), information pertaining to a blacklist of NET files (e.g., .NET files that are deemed suspicious and for which traffic is to be quarantined, deleted, or otherwise to be restricted from being executed), etc.

In some embodiments, system 200 comprises .NET extraction module 227. System 200 uses .NET extraction module 227 in connection with determining whether to extract information pertaining to (e.g., from) a header or metadata for a .Net file, and with extracting information for a .NET file (e.g., for analysis of whether the .NET file is malicious). In some embodiments, .NET extraction module 227 receives .NET files to be analyzed such as .NET files that are included as attachments to emails, instant messages, or that otherwise are communicated across or into/out of a network. .NET extraction module 227 determines to perform an extraction of information pertaining to a header or metadata for a file in response to determining that the file is a .NET file. As an example, .NET extraction module 227 determines that the file is a .NET file based on receiving an indication that the file corresponds to a .NET file. As another example, .NET extraction module 227 determines that the file is a .NET file based at least in part on a determination that the file comprises a .NET header. As another example, .NET extraction module 227 determines that the file is a .NET file based at least in part on a determination that the directory item has non-zero values (e.g., system 200 examines the binary structure of the file and determines whether values in the optional header value comprise non-zero values/locations, and if so, then determines that the file is a .NET file).

In some embodiments, .NET extraction module 227 obtains a .NET header and/or information from the .NET header of the .NET file (e.g., a CLR header of the .NET file). In response to determining that the file is a .NET file, .NET extraction module 227 obtains information pertaining to (e.g., from) a header for a file. In some embodiments, .NET extraction module 227 determines the .NET header and obtains information from the .NET header such as imported functions that are imported (or referenced) by the .NET header, etc. For example, the .NET extraction module 227 obtains imported API function names based at least in part on a .NET header of the .NET file. The .NET extraction module 227 obtains one or more data streams comprised in the .NET header and/or one or more tables comprised in (or referenced by) the .NET header. For example, the .NET extraction module 227 obtains the #Strings stream comprised in the .NET header. As another example, the .NET extraction module 227 obtains the ImplMap from the .NET file (e.g., from the .NET header). The ImplMap may include various information about any imported unmanaged functions of the .NET file. In some embodiments, the .NET extraction module 227 determines a set of imported functions (e.g., imported API function names) that are imported to the .NET file.

Examples of information that .NET extraction module 227 obtains (e.g., determines) from the .NET file (e.g., from the CLR header and/or CLR metadata for the .NET file) include one or more of version information for CLR metadata header, header flags, signature value(s), reserved value(s), a version length, a number of streams, an indication whether a CLR header flag is enabled, an indication whether a resources directory address is present, an indication whether the strong name signature address is present, a code manager table address, an indication of whether a code manager table address is present, an export address TableJumps, an indication of whether the export address TableJumps is present, a virtual table fix ups address, an indication of whether the virtual table fix ups address is present, a managed native header, a flag value, an indication of whether the .Net entry point is comprised in the Method Definition table, an indication of whether the .NET entry point is in an external file, an indication of whether an entry point is defined, a value of an entry point token, a number of entries in a table, an indication of whether the assembly table includes the name field, a number/count of external assemblies referenced, a number/count of culture values referenced in external assemblies, an indication of whether the Module table has a name field, user strings, a length of user strings, system strings, a number/count of unmanaged functions, a number/count of unmanaged modules, a number/count of events, an indication of whether the metadata table has extra data, hidden data directories, invalid type references, a number/count of type of references, a number/count of resources, a total size of resources, a number/count of publicly visible resources, a number/count of privately visible resources, a number/count of methods, etc., or any combination thereof.

According to various embodiments, in response to receiving the file to be analyzed to determine whether the file is malicious, system 200 places the file in a sandbox in which the file is to be analyzed. In some embodiments, .NET extraction module 227 extracts information pertaining to (e.g., from) a header for a file. As an example, .NET extraction module 227 extracts header information from the .NET header and/or the PE header for the .NET file in the sandbox. For example, system 200 invokes a sandbox for analysis of a particular file. As another example, system 200 uses a common sandbox for analysis of various files.

In response to determining the representative information or identifier(s) associated with the .NET file, system 200 (e.g., prediction module 233) may determine whether the .NET file corresponds to a previously analyzed .NET file (e.g., whether the .NET file matches a .NET file associated with historical information for which a maliciousness determination has been previously computed). As an example, prediction module 233 queries a database or mapping of previously analyzed .NET files and/or historical information such as blacklists of .NET files, and/or whitelists of NET files in connection with determining whether the .NET file was previously analyzed. In some embodiments, in response to determining that the .NET file does not correspond to a previously analyzed .NET file, prediction module 233 uses a classifier (e.g., a model such as a model trained using a machine learning process) to determine (e.g., predict) whether the .NET file is malicious. In some embodiments, in response to determining that the .NET file corresponds to a previously analyzed .NET file, prediction module 233 obtains an indication of whether the corresponding previously analyzed .NET file is malicious. Prediction module 233 can use the indication of whether the corresponding previously analyzed .NET file is malicious as an indication of whether the received .NET file is malicious.

In some embodiments, system 200 comprises feature vector determining module 229. System 200 uses feature vector determining module 229 to determine one or more feature vectors for (e.g., corresponding to) the .NET file. For example, system 200 uses feature vector determining module 229 to determine a set of feature vectors or a combined feature vector to use in connection with determining whether a .NET file is malicious. In some embodiments, feature vector determining module 229 determines a set of one or more feature vectors based at least in part on information pertaining to the .NET file (e.g., information obtained from the CLR metadata, the CLR header, etc.).

In some embodiments, system 200 (e.g., prediction module 233) uses a combined feature vector in connection with determining whether a .NET file is malicious. Feature vector determining module 229 may determine such a combined feature vector. The combined feature vector is determined based at least in part on the set of one or more feature vectors. For example, the combined feature vector is determined based at least in part on a set of feature vectors for a set of predefined features, and a set of feature vectors for the characteristics or relationships determined based on an algorithmic-based feature extraction. In some embodiments, feature vector determining module 229 determines the combined feature vector by concatenating the set of feature vectors with respect to the set of feature vectors for a set of predefined features and/or the set of feature vectors for the characteristics or relationships determined based on an algorithmic-based feature extraction. Feature vector determining module 229 concatenates the set of feature vectors according to a predefined process (e.g., predefined order, etc.).

In some embodiments, system 200 obtains traffic to be used in connection with determining one or more features and/or for training a model for determining whether a .NET file is malicious, or relationships (e.g., features) between characteristics of the .NET file and maliciousness of the .NET file. In some embodiments, system 200 generates the traffic to be used to characterize (e.g., determine features) or train the classifier (e.g., model), such as by using (e.g., invoking) a traffic generation tool.

In some embodiments, system 200 trains a model for detecting an exploit. For example, the model can be a model that is trained using a machine learning process. In connection with training the model, system 200 obtains sample exploit traffic (e.g., a set of malicious .NET files or information pertaining to such files), obtains sample benign traffic (e.g., a set of benign .NET files or information pertaining to such files), and obtains a set of exploit features based at least in part on the sample exploit traffic and the sample benign traffic. In some embodiments, the set of exploit features is determined (e.g., by model training module 231) based at least in part on one or more characteristics of the exploit traffic. As an example, the set of exploit features is determined based at least in part on one or more characteristics of the exploit traffic relative to one or more characteristics of the benign traffic.

In response to obtaining the sample exploit traffic, system 200 uses model training module 231 to perform a feature extraction (e.g., malicious feature extraction). The malicious feature extraction can include one or more of (i) using a set of predefined features to obtain specific features from .Net files, and (ii) using an algorithmic-based feature extraction to filter out described features from a set of raw input data. In some embodiments, system 200 (e.g., model training module 231) uses sample exploit traffic (e.g., malicious traffic, a set of malicious .NET files, or information associated with a set of malicious .NET files) and not sample benign traffic in connection with determining the one or more features (e.g., performing the malicious feature extraction). In some embodiments, system 200 (e.g., model training module 231) uses both sample exploit traffic (e.g., malicious traffic) and sample benign traffic in connection with determining the one or more features (e.g., performing the malicious feature extraction).

In some embodiments, system 200 comprises model training module 231. System 200 uses model training module 231 to determine a model (e.g., a classifier) for determining whether the .NET file is malicious, or relationships (e.g., features) between characteristics of the .NET file and maliciousness of the .NET file. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, model training module 231 trains an XGBoost machine learning classifier model. Inputs to the classifier (e.g., the XGBoost machine learning classifier model) are a combined feature vector or set of feature vectors and based on the combined feature vector, or set of feature vectors, the classifier model determines whether the corresponding .NET file is malicious, or a likelihood that the .NET file is malicious.

In some embodiments, system 200 comprises prediction module 233. System 200 uses prediction module 233 to determine (e.g., predict) whether a .NET file is malicious or a likelihood that the .NET file is malicious. Prediction module 233 uses a model such as a machine learning model trained by model training module 231 in connection with determining whether a .NET file is malicious or a likelihood that the .NET file is malicious. For example, prediction module 233 uses the XGBoost machine learning classifier model to analyze the combined feature vector to determine whether the .NET file is malicious.

In some embodiments, prediction module 233 determines whether information pertaining to a particular .NET file (e.g., a hash or other signature corresponding to a .NET file being analyzed) is comprised in a dataset of historical .NET files and historical information associated with the historical dataset indicating whether a particular .NET file is malicious (e.g., a third-party service such as VirusTotal™). In response to determining that information pertaining to a particular .NET file is not comprised in, or available in, a dataset of historical .NET files and historical information, prediction module 233 may deem the .NET file to be benign (e.g., deem the .NET file to not be malicious). An example of the historical information associated with the historical .NET files indicating whether particular .NET files are malicious corresponds to a VirusTotal® (VT) score. In the case of a VT score greater than 0 for a particular .NET file, the particular .NET file is deemed malicious by the third-party service. In some embodiments, the historical information associated with the historical .NET file indicating whether a particular .NET file is malicious corresponds to a social score such as a community-based score or rating (e.g., a reputation score) indicating that a .NET file is malicious or likely to be malicious. The historical information (e.g., from a third-party service, a community-based score, etc.) indicates whether other vendors or cyber security organizations deem the particular .NET file to be malicious.

System 200 may determine (e.g., compute) a hash or signature corresponding to the .NET file and perform a lookup against the historical information (e.g., a whitelist, a blacklist, etc.). In some implementations, prediction module 233 corresponds to, or is similar to, prediction engine 174. System 200 (e.g., prediction module 233) may query, via communication interface 205, a third party (e.g., a third-party service) for historical information pertaining to .NET files (or a set of NET files or hashes/signatures for .NET files previously deemed to be malicious or benign). System 200 (e.g., prediction module 233) may query the third party at predetermined intervals (e.g., customer-specified intervals, etc.). As an example, prediction module 233 may query the third party for information for newly analyzed .NET files daily (or daily during the business week).

In some embodiments, system 200 comprises notification module 235. System 200 uses notification module 235 to provide an indication of whether the .NET file is malicious (e.g., to provide an indication that the .NET file is malicious). For example, notification module 235 obtains an indication of whether the .NET file is malicious (or a likelihood that the .NET file is malicious) from prediction module 233 and provides the indication of whether the .NET file is malicious to one or more security entities and/or one or more endpoints. As another example, notification module 235 provides to one or more security entities (e.g., a firewall), nodes, or endpoints (e.g., a client terminal), an update to a whitelist of NET files and/or a blacklist of .NET files. According to various embodiments, notification module 235 obtains a hash, signature, or other unique identifier associated with the .NET file, and provides the indication of whether the .NET file is malicious in connection with the hash, signature, or other unique identifier associated with the .NET file.

According to various embodiments, the hash of a .NET file corresponds to a hash using a predetermined hashing function (e.g., an MD5 hashing function, etc.). A security entity or an endpoint may compute a hash of a received .NET file (e.g., an SQL statement or SQL command, or other command injection string input to an SQL interface or other database user interface, etc.). The security entity or an endpoint may determine whether the computed hash corresponding to the .NET file is comprised within a set such as a whitelist of benign .NET files, and/or a blacklist of malicious .NET files, etc. If a signature for malware (e.g., the hash of the received .NET file) is included in the set of signatures for malicious .NET files (e.g., a blacklist of malicious .NET files), a security entity or an endpoint can prevent the transmission of .NET files to an endpoint (e.g., a client device, a database system, etc.) and/or prevent an opening or execution of the .NET file accordingly.

In some embodiments, system 200 comprises security enforcement module 237. System 200 uses security enforcement module 237 to enforce one or more security policies with respect to information such as network traffic, .NET files, files, etc. Security enforcement module 237 enforces the one or more security policies based on whether the .NET file is determined to be malicious. As an example, in the case of system 200 being a security entity or firewall, system 200 comprises security enforcement module 237. Firewalls typically deny or permit network transmissions based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, information obtained via a web interface or other user interface such as an interface to a database system (e.g., an SQL interface), and/or other file transfers.

According to various embodiments, storage 215 comprises one or more of filesystem data 260, model data 265, and/or prediction data 270. Storage 215 comprises a shared storage (e.g., a network storage system) and/or database data, and/or user activity data.

In some embodiments, filesystem data 260 comprises a database such as one or more datasets (e.g., one or more datasets for .NET files, exploit traffic, and/or .NET file attributes, mappings of indicators of maliciousness to .NET files or hashes, signatures or other unique identifiers of .NET files, mappings of indicators of whether a particular .NET file is benign to .NET files or hashes, signatures or other unique identifiers of .NET files, etc.). Filesystem data 260 comprises data such as historical information pertaining to .NET files (e.g., maliciousness of .NET files), a whitelist of NET files deemed to be safe (e.g., not suspicious, benign, etc.), a blacklist of NET files deemed to be suspicious or malicious (e.g., .NET files for which a deemed likelihood of maliciousness exceeds a predetermined/preset likelihood threshold), information associated with suspicious or malicious .NET files, etc.

Model data 265 comprises information pertaining to one or more models used to determine whether a .NET file is malicious or a likelihood that a .NET file is malicious. As an example, model data 265 stores the classifier (e.g., the XGBoost machine learning classifier model) used in connection with a set of feature vectors or a combined feature vector. Model data 265 comprises a feature vector that may be generated with respect to each of the one or more of (i)

a set of predefined features (e.g., features defined by an administrator, etc.), and/or (ii) algorithmic-based features (e.g., a feature extracted using TF-IDF such as with respect to sample exploit traffic, etc.). In some embodiments, model data 265 comprises a combined feature vector that is generated based at least in part on the one or more feature vectors corresponding to each of the one or more of (i) a set of predefined features, and/or (ii) algorithmic-based features (e.g., a feature extracted using TF-IDF such as with respect to sample exploit traffic, etc.).

Prediction data 270 comprises information pertaining to a determination of whether the .NET file analyzed by system 200 is malicious. For example, prediction data 270 stores an indication that the .NET file is malicious, an indication that the .NET file is benign, etc. The information pertaining can be obtained by notification module 235 and provided (e.g., communicated to the applicable security entity, endpoint, or other system). In some embodiments, prediction data 270 comprises hashes or signatures for .NET files such as .NET files that are analyzed by system 200 to determine whether such NET files are malicious, or a historical dataset that has been previously assessed for maliciousness such as by a third party. Prediction data 270 can include a mapping of hash values to indications of maliciousness (e.g., an indication that the corresponding is malicious or benign, etc.).

According to various embodiments, memory 220 comprises executing application data 275. Executing application data 275 comprises data obtained or used in connection with executing an application such as an application executing a hashing function, an application to extract information from a .NET file, an application to extract information from a file, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious files, a document preparation application, a report preparation application, a user interface application, a data analysis application, an anomaly detection application, a user authentication application, a security policy management/update application, etc.).

According to various embodiments, the system extracts information from a .NET file (e.g. from a CLR header or CLR metadata of the .NET file) to be analyzed. An example of the information extracted from the .NET file and/or the extraction of such information is described further in connection with FIGS. 3A-3G.

FIG. 3A is an illustration of an ImplMap table of a .NET header for an example .NET file. In the table 300 illustrated in FIG. 3A, an ImplMap table of a 32-bit DLL sample is provided. In some embodiments, the ImplMap table for a sample is obtained by inputting the 32-bit DLL sample to a debugger and/or .NET assembly editor. An example of such a debugger and/or .NET assembly editor is dnSpy. Various other debuggers and/or .NET assembly editors may be implemented.

According to various embodiments, the system determines an index to the #Strings stream based at least in part on the ImplMap table. In some embodiments, the index to the #Strings stream corresponds to the ImportName table. The #Strings stream generally corresponds to an array of null-terminated strings in which most of the strings of the .NET file reside. The system determines the index to the #Strings stream using the column labeled ImportName. The name of the function can be determined using the index value from the ImportName column. In table 300 the name of the function corresponding to the value of the ImportName is provided in the Info column.

In response to determining the index value from the ImportName and/or the function name for the imported function, the system determines the library name for the corresponding library (e.g., the DLL). In some embodiments, the system determines the library (e.g., the library name) based at least in part on the ModuleRef table of the .NET file.

FIG. 3B is an illustration of a ModuleRef table of an example .NET file. In the table 310 illustrated in FIG. 3B, a ModuleRef table of the 32-bit DLL sample analyzed with respect to table 300 of FIG. 3A is provided. In some embodiments, the ModuleRef table for a sample is obtained by inputting the 32-bit DLL sample to a debugger and/or .NET assembly editor.

According to various embodiments, the system uses the index value from the ImportName field (e.g., column) of the ImplMap table as an index to determine a corresponding library (e.g., library name). The system uses the index value as a lookup in the Name column of table 310. For example, the Name column is an index to the #Strings stream. The info column of the ModuleRef table comprises an indication of the field. For example, the library name corresponding to the index value 0x18F3 in the Name column is kernel32.dll.

FIG. 3C is an illustration of an ImplMap table of a .NET header for an example .NET file. In the table 320 illustrated in FIG. 3C, an ImplMap table of a 32-bit EXE sample is provided. The 32-bit EXE was created using a Visual C++ compiler and the C++/CLI extension. In some embodiments, the ImplMap table for a sample is obtained by inputting the 32-bit DLL sample to a debugger and/or .NET assembly editor. An example of such a debugger and/or .NET assembly editor is dnSpy. Various other debuggers and/or .NET assembly editors may be implemented.

As illustrated in FIG. 3C, the first three rows of table 320 have a value comprised in the Info column. Accordingly, for the first three rows, the process described in connection with table 300 of FIG. 3A and table 310 of FIG. 3B to determine the function name and corresponding library name may be performed (e.g., to determine the library-function name pairs). However, the remaining rows of the ImplMap table of FIG. 3C have a null value or zero. The null value or zero entries in the remaining rows may result because the corresponding functions are not used by the sample author, but instead are part of the C++/CLI created runtime methods used internally. In some embodiments, the system determines the function name and library name based on the MethodDef table for the file. For example, the system uses values included in the MemberForward column of the ImplMap table (e.g., table 320) as an index to the MethodDef table. As an example, the MemberForward value is referred to as a coded index into the MethodDef table (e.g., the coded index is defined in the .NET specification ECMA-335).

According to various embodiments, the system obtains the values from the remaining rows of the MemberForward column of the ImplMap table of FIG. 3C, decodes the values obtained from the MemberForward column, and uses the decoded value as an index to the MethodDef table. As an example, the value from the 4th row of the MemberForward column is 0x99, which is decoded to correspond to 76. Accordingly, 76 is used as the index value to determine information from the MethodDef table.

FIG. 3D is an illustration of a MethodDef table for an example .NET file. In the table 330 illustrated in FIG. 3D, a MethodDef table of the sample analyzed with respect to table 320 of FIG. 3C is provided. In some embodiments, the MethodDef table for a sample is obtained by inputting the sample to a debugger and/or .NET assembly editor.

Using the index value obtained from the MemberForward column of the ImplMap, the system determines an index to the #Strings stream. For example, the system uses the index value obtained from the MemberForward column of the ImplMap as a lookup in the Name column of the MethodDef table. The index value in the Name column corresponding to the index 76 from the MemberForward column is 0x1831. As illustrated in table 330, the Info column of the MethodDef table indicates that the function name is _amsg_exit.

FIG. 3E is an illustration of a ModuleRef table for an example .NET file. In the table 340 illustrated in FIG. 3E, a ModuleRef table of the sample analyzed with respect to table 320 of FIG. 3C is provided. In some embodiments, the ModuleRef table for a sample is obtained by inputting the sample to a debugger and/or .NET assembly editor.

According to various embodiments, the system determines the library name in response to determining the function name (e.g., the function name obtained from the MethodDef table). For examples, the system performs a lookup in the ImplMap table (e.g., table 320 in FIG. 3C) and determines that the value in the ImportScope column is 2 for the remaining rows. The system uses the index value 2 from the ImportScope column as an index for the ModuleRef table. In response to performing a lookup in the ModuleRef table (e.g., table 340) using the index value 2 (e.g., from the ImportScope column of the ImplMap table), the system determines that the value in the Name column is also 0. Thus, the system determines that the ModuleRef does not provide an indication of the library names.

According to various embodiments, in response to determining that ModuleRef does not provide an indication of the library names corresponding to a function, the system determines to use the retrieved function names from the MethodDef table and parse the import table in the PE header. The import table in the PE header comprises statically used functions (e.g., all statically used functions) of the file with their corresponding library names where the statically used functions reside (DLLs). For example, the system uses a PE header parser to parse the import table in the PE header. An example of a PE header parser is pefile (e.g., an open-source project called pefile), which is a PE header parser coded in Python. In some embodiments, the system performs a 1:1 comparison of the function name obtained from the MethodDef table and the function in the import table of the PE header. As an example, files that are written in C++ (like mixed assemblies) can have so called decorated names as function names in the import table. The process of creating these names is known as name mangling. Such decorated function names are created by the C++ compiler automatically for every C++ function, except when the function is defined as extern "C."

FIG. 3F is an illustration of an Import table for an example .NET file. In the example shown in FIG. 3F, table 350 is an import table comprised in the PE header of the .NET file.

FIG. 3G is an illustration of a MethodDef table for an example .NET file. In the example shown, table 360 is the MethodDef table for the .NET file. In some embodiments, in response to the system determining that a function name obtained from the MethodDef table matches a function name in the import table comprised in the PE header, the system obtains the corresponding library name from the import table. According to various embodiments, the system performs the lookup for matching function names between the MethodDef and the import table comprised in the PE header to obtain corresponding library names.

Figure 4:
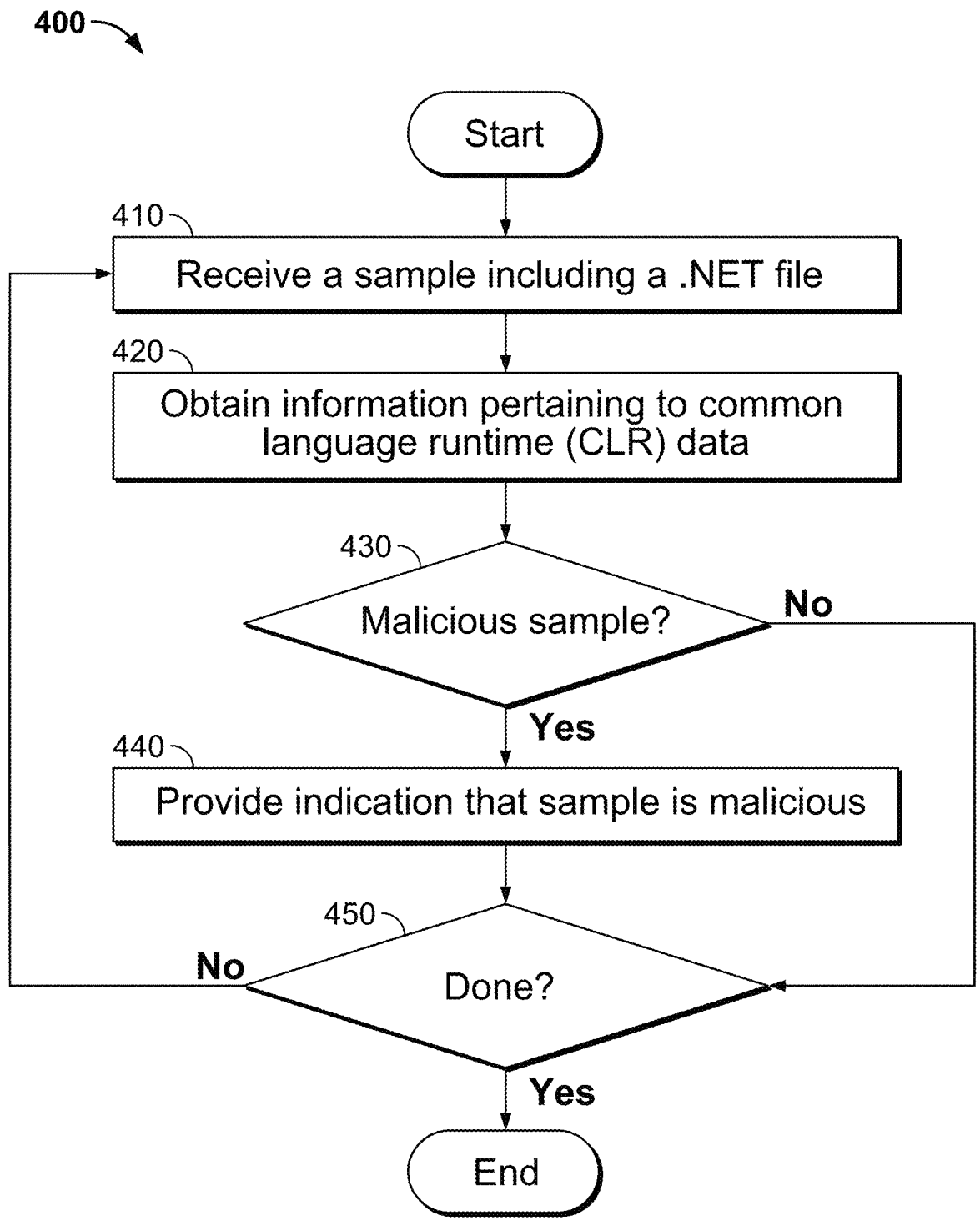
FIG. 4 is a flow diagram of a method for detecting a malicious file according to various embodiments.

FIG. 4 is a flow diagram of a method for detecting a malicious file according to various embodiments. In some embodiments, process 400 is implemented at least in part by system 100 of FIG. 1 and/or system 200 of FIG. 2. In some implementations, process 400 may be implemented by one or more servers, such as in connection with providing a service to a network (e.g., a security entity and/or a network endpoint such as a client device). In some implementations, process 400 may be implemented by a security entity (e.g., a firewall) such as in connection with enforcing a security policy with respect to files communicated across a network or in/out of the network. In some implementations, process 400 may be implemented by a client device such as a laptop, a smartphone, a personal computer, etc., such as in connection with executing or opening a file such as an email attachment.

At 410, a sample is received. The sample may include a .NET file. In some embodiments, the system receives a sample (e.g., a .NET file) from a security entity (e.g., a firewall), an endpoint (e.g., a client device), etc. For example, in response to determining that a file is attached to a communication such as an email or an instant message, the security entity or endpoint provides (e.g., sends) the file to the system. The sample may be received in connection with a request to determine whether the file is malicious.

In the case that process 400 is implemented by a security entity, the sample may be received such as in connection with routing traffic to an applicable network endpoint (e.g., a firewall obtains the sample from an email attachment for an email directed to a client device). In the case that process 400 is implemented by a client device, the sample may be received by an application or layer monitoring incoming/outgoing information. For example, a process (e.g., an application, an operating system process, etc.) may run in the background to monitor and obtain email attachments, files exchanged over an instant messaging program, etc.

At 420, information pertaining to common language runtime (CLR) data is obtained from the sample. In some embodiments, the CLR data is obtained from CLR metadata or a CLR header of the .NET file. In response to receiving the sample, the system determines that the sample includes a .NET file, and in response to determining that the sample includes a .NET file, the system extracts the CLR data from the .NET file.

In some embodiments, in response to receiving the sample and/or a request to assess whether the sample (e.g., the .NET file) is malicious, the system parses the sample to obtain information pertaining to (e.g., comprised in) the .NET header of the sample.

According to various embodiments, the system determines the CLR header and/or information pertaining to the CLR header or metadata. For example, the system determines the .NET header and obtains imported functions that are imported (or referenced) by the .NET header. For example, the system obtains imported API function names based at least in part on a .NET header of the .NET file. In some embodiments, the system obtains one or more data streams comprised in the .NET header and/or one or more tables comprised in (or referenced by) the .NET header. For example, the system obtains the #Strings stream comprised in the .NET header. In some embodiments, the system obtains the ImplMap from the .NET file (e.g., from the .NET header). The ImplMap may include various information about any imported unmanaged functions of the .NET file. In some embodiments, the system determines a set of imported functions (e.g., imported API function names) that are imported to the .NET file.

In some embodiments, the system determines (e.g., obtains) a set of unmanaged functions comprised in, or referenced by, the .NET file, such as a list of unmanaged functions imported via the .NET header of the .NET file. For example, the system determines the set of unmanaged imported functions from the set of imported functions (e.g., imported API function names) that are imported to the .NET file. The system uses information comprised in (or referenced by) the .NET header to determine unmanaged code or an unmanaged function (e.g., the unmanaged function and corresponding library). In some embodiments, the system determines a set of used unmanaged win32 API functions imported to the .NET file.

At 430, a determination is made as to whether the sample is malicious. In some embodiments, the system determines whether the sample is malicious based at least in part on a result of an analysis of the .NET file using the machine learning model. For example, the system generates one or more feature vectors based at least in part on the information pertaining to common language runtime (CLR) data, and queries a classifier (e.g., a model trained using a machine learning process) to provide a prediction of whether the sample is malicious based at least in part on the one or more feature vectors.

The model may provide an indication (e.g., a prediction) of whether the sample is malicious, or a likelihood of whether the sample is malicious. In response to receiving a likelihood of whether the sample is malicious, the system can determine whether the sample is malicious based at least in part on one or more thresholds. For example, if the likelihood that the sample is malicious exceeds a first predefined likelihood threshold, the system deems the sample as malicious. As another example, if the likelihood that the sample is malicious is below one or more of the first predefined likelihood threshold and a second likelihood threshold, the system deems the sample to be non-malicious (e.g., benign). In some implementations, the system deems the sample to be non-malicious if the likelihood that the sample is malicious is below the first predefined likelihood threshold. In some implementations, the system deems the sample to be non-malicious if the likelihood that the sample is malicious is below the second predefined likelihood threshold, wherein the second predefined likelihood threshold is lower than the first predefined threshold.

In some implementations, if the likelihood that the sample is malicious is between the first predefined threshold and the second predefined threshold, the system deems that the analysis of the sample is indeterminate. For example, the system forwards the sample (or information corresponding to the sample) to another system or another classifier. As an example, in the case that analysis of the sample is indeterminate using an XGBoost model, the system analyzes the sample using a neural network model and/or an IPS analysis.

The predefined likelihood threshold(s) can be configured to adjust the sensitivity of the classifier.

In some embodiments, the system determines whether information pertaining to a particular sample (e.g., an Unmanaged Imphash corresponding to a hash of a list of unmanaged functions referenced or invoked by the sample, or other signature/hash corresponding to a .NET file being analyzed) is comprised in a dataset of historical files and historical information associated with the historical dataset indicating whether a particular sample is malicious (e.g., a third party service such as VirusTotal™). As an example, in response to determining that information pertaining to a particular sample is not comprised in, or available in, a dataset of historical files and historical information, the system deems the file to be benign (e.g., deems the file to not be malicious). An example of the historical information associated with the historical files indicating whether a particular sample is malicious corresponds to a VirusTotal® (VT) score. In the case of a VT score greater than 0 for a particular sample, the particular sample is deemed malicious by the third party service. In some embodiments, the historical information associated with the historical file indicating whether a particular sample is malicious corresponds to a social score such as a community-based score or rating (e.g., a reputation score) indicating that a file is malicious or likely to be malicious. The historical information (e.g., from a third party service, a community-based score, etc.) indicates whether other vendors or cyber security organizations deem the particular file to be malicious.

In response to a determination at 430 that the sample is malicious, process 400 proceeds to 440 at which an indication that the sample is malicious is provided. For example, the indication that the sample is malicious may be provided to the component from which the sample is received. As an example, the system provides the indication that the sample is malicious to a security entity. As another example, the system provides the indication that the sample is malicious to a client device. In some embodiments, the indication that the sample is malicious is provided to a user such as a user of a client device and/or a network administrator.

According to various embodiments, in response to receiving the indication that the sample is malicious, an active measure may be performed. The active measure may be performed in accordance with (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when a device attempts to open or execute the file, blocking transmission of the file, updating a blacklist of malicious files (e.g., a mapping of a hash for the file to an indication that the file is malicious), etc.

In response to a determination that the sample is not malicious at 430, process 400 proceeds to 450. In some embodiments, in response to determining that the sample is not malicious, a mapping of files (or hashes/signatures of files) to an indication that the file is not malicious is updated. For example, a whitelist of benign files is updated to include the sample, or hash, signature, or other unique identifier associated with the sample.

At 450, a determination is made as to whether process 400 is complete. In some embodiments, process 400 is determined to be complete in response to a determination that no further samples are to be analyzed (e.g., no further predictions for samples are needed), an administrator indicates that process 400 is to be paused or stopped, etc. In response to a determination that process 400 is complete, process 400 ends. In response to a determination that process 400 is not complete, process 400 returns to 410.

Figure 5:
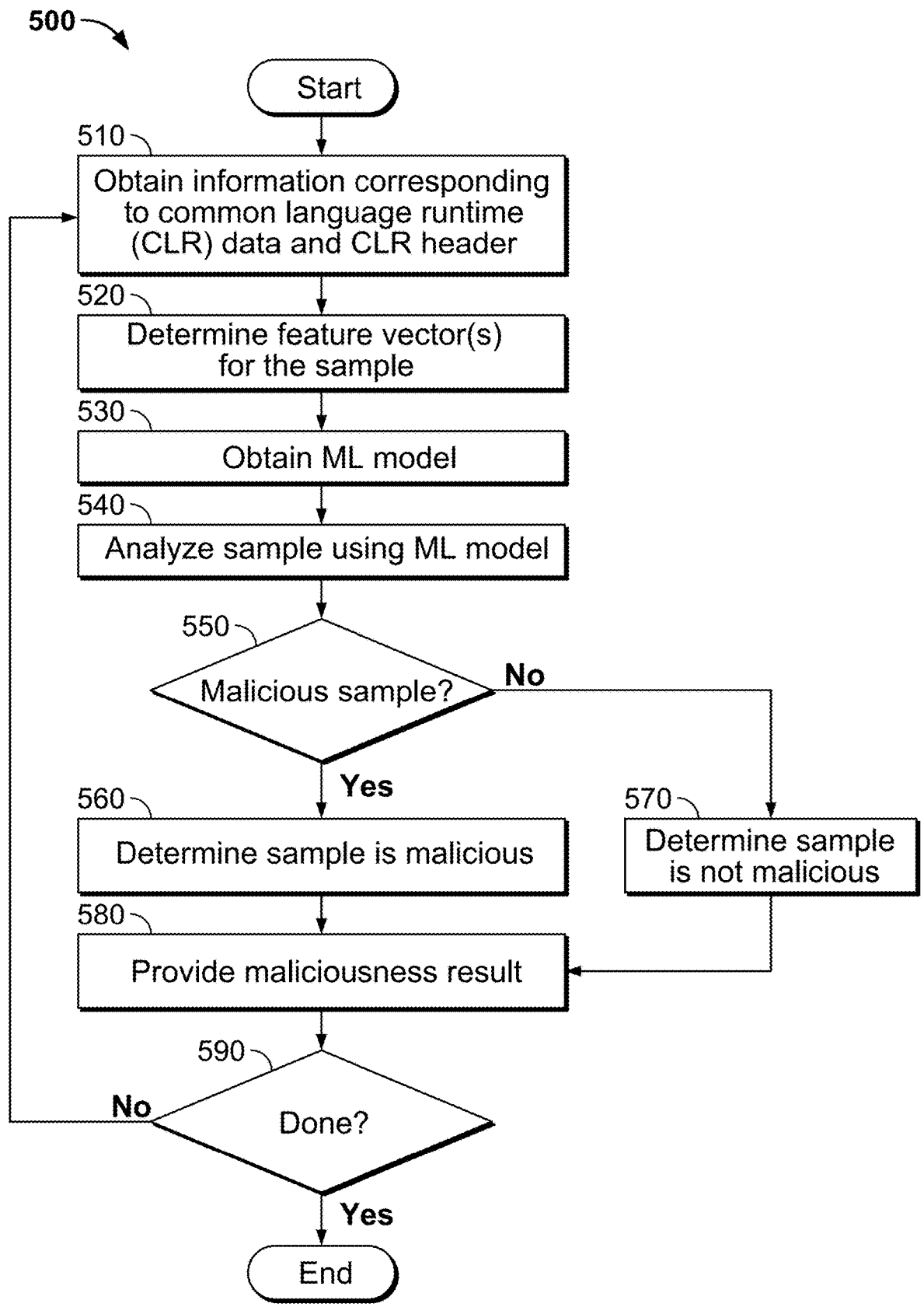
FIG. 5 is a flow diagram of a method for determining whether a file is malicious according to various embodiments.

FIG. 5 is a flow diagram of a method for determining whether a file is malicious according to various embodiments. In some embodiments, process 500 is implemented at least in part by system 100 of FIG. 1 and/or system 200 of FIG. 2. In some implementations, process 500 may be implemented by one or more servers, such as in connection with providing a service to a network (e.g., a security entity and/or a network endpoint such as a client device). In some implementations, process 500 may be implemented by a security entity (e.g., a firewall) such as in connection with enforcing a security policy with respect to files communicated across a network or in/out of the network. In some implementations, process 500 may be implemented by a client device such as a laptop, a smartphone, a personal computer, etc., such as in connection with executing or opening a file such as an email attachment.

According to various embodiments, process 500 is invoked in connection with 430 of process 400 of FIG. 4.

At 510, information corresponding to the CLR data and/or CLR header is obtained. The system can receive the .NET file (e.g., from an endpoint or security entity, or otherwise via an interface such as an interface for a database system), and the system characterizes the .NET file such as by determining whether the .NET file (e.g., the CLR metadata or CLR header) exhibits one or more characteristics associated with features corresponding to a model.

At 520, one or more feature vectors are determined based at least in part on the information corresponding to the CLR data and/or CLR header.

At 530, a model is obtained. In some embodiments, the model is trained based at least in part on a machine learning process. The system may store a mapping of models to predictions for maliciousness. For example, the system may store a mapping of models to types of files for which predictions are to be provided. In response to determining that the sample is a .NET file, the system obtains the model mapped to providing predictions of maliciousness for .NET files. The obtaining the model may include obtaining a path or location at which the model is to be queried.

At 540, the sample is analyzed using the model. In some embodiments, the system queries the model based at least in part on the one or more feature vectors for the sample. In some embodiments, the classifier is a machine learning classifier that is trained using a machine learning process. For example, the classifier corresponds to an XGBoost machine learning classifier model. The system uses a model, such as a machine learning model trained by a machine learning process, in connection with determining whether the .NET file is malicious or a likelihood that the .NET file is malicious. For example, the system uses the XGBoost machine learning classifier model to analyze the one or more feature vectors (e.g., the combined feature vector) to determine whether the .NET file is malicious.

At 550, a determination is performed as to whether the sample is malicious. In some embodiments, the system determines whether the sample is malicious based at least in part on a result of the analysis of the sample using the model.

In some embodiments, the system determines whether classification of the one or more feature vectors corresponding to the sample indicates that the sample corresponds to a malicious .NET file. In some embodiments, if a result of analyzing the feature vector(s) (e.g., the combined feature vector) using the classifier is less than a predefined threshold (e.g., a predefined maliciousness threshold), the system deems (e.g., determines) that the sample is not malicious (e.g., the .NET file is benign). For example, if the result from analyzing the feature vector(s) indicates a likelihood of whether the sample is malicious, then the predefined threshold can correspond to a threshold likelihood. As another example, if the result from analyzing the feature vector(s) indicates a degree of similarity of the sample to a malicious .NET file, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the sample is malicious (e.g., the .NET file is an exploit).

In response to a determination that the classification of the one or more feature vectors indicates that the sample corresponds to a malicious .NET file at 550, process 500 proceeds to 560 at which the sample .NET file is determined to be malicious.

In response to a determination that the classification of the one or more feature vectors indicates that the sample does not correspond to a malicious .NET file at 550, process 500 proceeds to 570 at which the sample is determined to be not malicious. In some embodiments, the system determines that the sample is benign in response to a determination that the classifier indicates that the sample is not malicious, or that a likelihood that the sample is malicious is less than a predefined maliciousness threshold.

At 580, a maliciousness result is provided. In some embodiments, the system provides an indication of whether the sample corresponds to a malicious .NET file. For example, the system provides an update to a blacklist or other mapping of files to malicious files to include the sample .NET file (e.g., a unique identifier associated with the sample such as a hash, a signature, etc.). The system may further provide the corresponding updated blacklist or other mapping to an endpoint, a security entity, etc. For example, the system pushes an update to the blacklist or other mapping of files to malicious files to other devices that enforce one or more security policies with respect to traffic or files, or that are subscribed to a service of the system.

At 590, a determination is made as to whether process 500 is complete. In some embodiments, process 500 is determined to be complete in response to a determination that no further samples are to be analyzed (e.g., no further predictions for samples are needed), an administrator indicates that process 500 is to be paused or stopped, etc. In response to a determination that process 500 is complete at 590, process 500 ends. In response to a determination that process 500 is not complete at 590, process 500 returns to 510.

Figure 6:
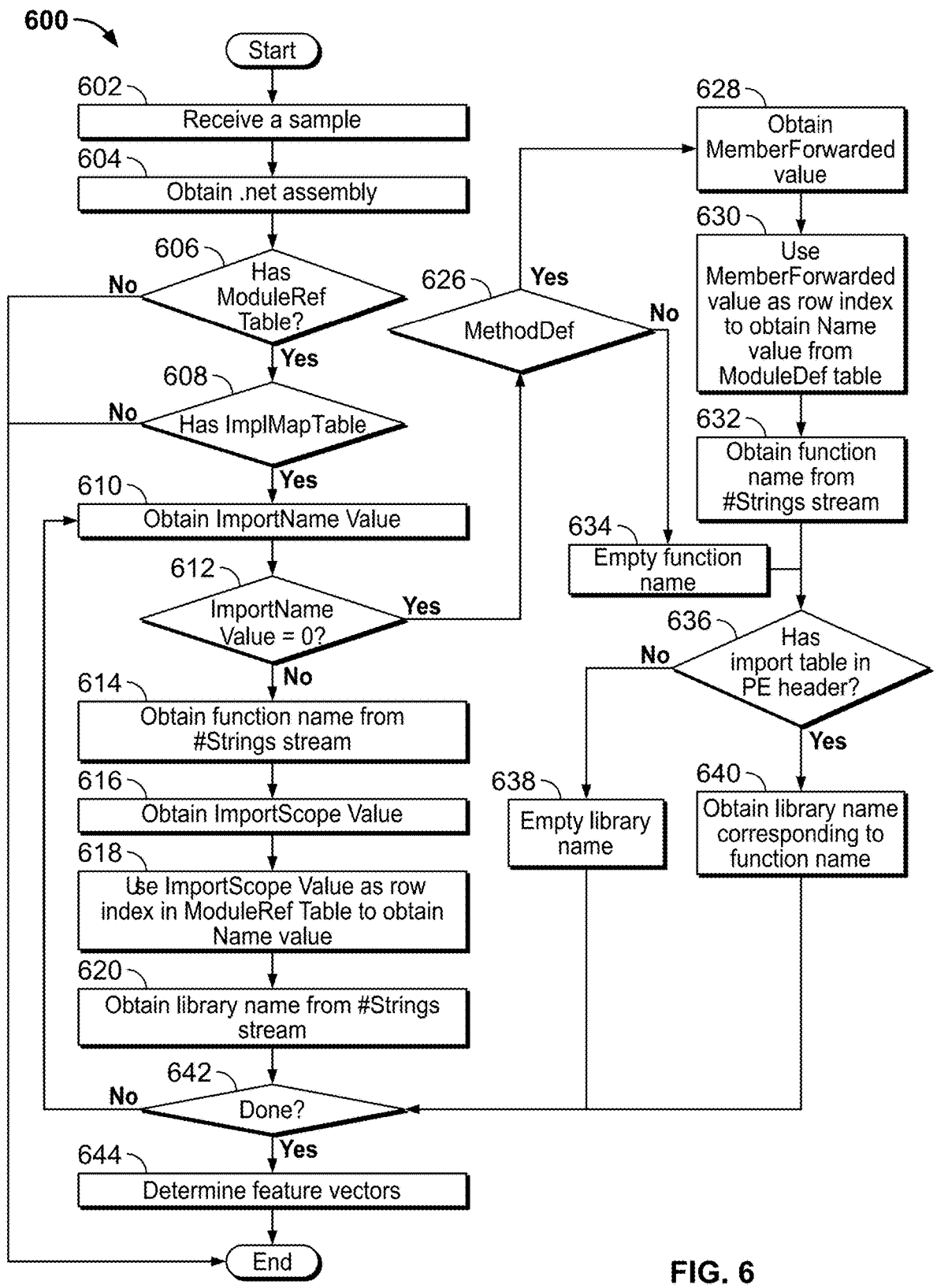
FIG. 6 is a flow diagram of a method for determining whether a file is malicious according to various embodiments.

FIG. 6 is a flow diagram of a method for determining whether a file is malicious according to various embodiments. In some embodiments, process 600 is implemented at least in part by system 100 of FIG. 1 and/or system 200 of FIG. 2. In some implementations, process 600 may be implemented by one or more servers, such as in connection with providing a service to a network (e.g., a security entity and/or a network endpoint such as a client device). In some implementations, process 600 may be implemented by a security entity (e.g., a firewall) such as in connection with enforcing a security policy with respect to files communicated across a network or in/out of the network. In some implementations, process 600 may be implemented by a client device such as a laptop, a smartphone, a personal computer, etc., such as in connection with executing or opening a file such as an email attachment.

Process 600 may be invoked in connection with obtaining information pertaining to CLR data.

At 602, a sample is received.

At 604, a .NET assembly corresponding to the sample is obtained. In some embodiments, the sample is compressed (e.g., in a ZIP format, etc.) and the .NET assembly is extracted from the compressed file. In some embodiments, obtaining the .NET assembly comprises determining that the sample is a .NET file.

At 606, a determination of whether the .NET assembly comprises a ModuleRef table is made. In response to determining that the .NET assembly does not comprise a ModuleRef table, process 600 ends. Conversely, in response to determining that the .NET assembly comprises a ModuleRef table, process 600 proceeds to 608.

At 608, a determination of whether the .NET assembly comprises an ImplMap table is made. In response to determining that the .NET assembly does not comprise an ImplMap table, process 600 ends. Conversely, in response to determining that the .NET assembly comprises an ImplMap table, process 600 proceeds to 610.

At 610, an ImportName value is obtained. In some embodiments, the system obtains the ImportName value from the ImportName column of the ImplMap table. For example, the system obtains the ImportName value from an applicable row (e.g., a selected row) of the ImportName column. In some embodiments, the system iterates over the rows of the ImportName to obtain values for each applicable row of the ImportName column.

At 612, a determination is made of whether the ImportName value obtained at 610 is equal to 0. In response to a determination that the ImportName value obtained at 610 is equal to 0, process 600 proceeds to 626. In response to a determination that the ImportName value obtained at 610 is not equal to 0, process 600 proceeds to 614.

At 614, a function name is obtained from the #Strings stream. In some embodiments, the system obtains the function name from the #Strings stream of the .NET assembly using the selected row.

At 616, a value from the ImportScope column is obtained. In some embodiments, the system obtains the value from the ImportScope column of the ImplMap table. The system obtains the ImplMap table using the .NET header (e.g., the .NET header comprises the ImplMap table). The value in the ImportScope column is obtained from the selected row (e.g., the row of the ImplMap table from which the ImportName value is obtained and/or the row for the Info column from which the #Strings stream information is obtained). In some embodiments, the value from the ImportScope column is used as an index in connection with performing a lookup into the ModuleRef table (e.g., for the name of the corresponding library).

At 618, the ImportScope value is used as a row index in the ModuleRef table to obtain a value. In some embodiments, the system obtains the ModuleRef table using the .NET header (e.g., the .NET header comprises the ModuleRef table). The system performs a lookup in the ModuleRef table using the value obtained from the ImportScope column as an index. For example, the system uses the value obtained from the ImportScope column to determine a row of the ModuleRef table from which the system is to obtain a value from the Name column. In some embodiments, the value obtained from the Name column of the ModuleRef table is used as an index to the #Strings stream.

At 620, a library name is obtained from the #Strings stream. In some embodiments, the system obtains the #Strings stream using the .NET header (e.g., the .NET header comprises the #Strings stream). The system performs a lookup in the #Strings stream using the value obtained from the Name column as an index.

At 626, a determination of whether the .NET assembly comprises a MethodDef table is made. In response to determining that the .NET assembly does not comprise a MethodDef table, process 600 proceeds to 634 at which the system deems that the .NET header has an empty function name. Conversely, in response to determining that the .NET assembly comprises a MethodDef table, process 600 proceeds to 628.

At 628, a value is obtained from the MemberForwarded column of the ImplMap table. The system obtains the ImplMap table using the .NET header (e.g., the .NET header comprises the ImplMap table). The value in the MemberForwarded column is obtained from the selected row (e.g., the row of the ImplMap table from which the MemberForwarded value is obtained). In some embodiments, the value from the MemberForwarded column is used as an index in connection with performing a lookup into the ModuleRef table (e.g., for the name of the corresponding library).

At 630, the MemberForwarded value is used as a row index in the ModuleRef table to obtain a value. In some embodiments, the system obtains the ModuleRef table using the .NET header (e.g., the .NET header comprises the ModuleRef table). The system performs a lookup in the ModuleRef table using the value obtained from the MemberForwarded column as an index. For example, the system uses the value obtained from the Name column to determine a row of the ModuleRef table from which the system is to obtain a value from the #Strings stream.

At 632, a function name is obtained from the #Strings stream. In some embodiments, the system obtains the #Strings stream using the .NET header (e.g., the .NET header comprises the #Strings stream). The system performs a lookup in the #Strings stream using the value obtained from the Name column in the ModuleDef table as an index.

At 636, a determination of whether the PE header has an import table is performed. In some embodiments, the system determines whether the PE header comprises an import table in connection with determining a library name corresponding to the function name (e.g., the function name obtained from the #Strings stream).

In response to a determination that the PE header does not have an import table at 636, process 600 proceeds to 638 at which the system deems the library name to be an empty library name. Conversely, in response to a determination that the PE header has an import table at 636, process 600 proceeds to 640 at which the library name corresponding to the function name is obtained. In some embodiments, the system parses the import table to obtain the library name corresponding to the function name. In response to obtaining the library name, process 600 proceeds to 642.

At 642, a determination is made as to whether the extraction of CLR data such as unmanaged functions referenced or invoked by the .NET header is complete. In some embodiments, the system determines that extraction of the CLR data is complete in response to a determination that no further imported functions and/or corresponding libraries are to be obtained (e.g., no further imported functions are comprised or referenced in the .NET header), an administrator indicates that process 600 is to be paused or stopped, etc. In response to a determination that no further imported functions and/or corresponding libraries are to be added to the list at 642, process 600 proceeds to 644 at which the system determines (e.g., computes) one or more feature vectors corresponding to the CLR data (e.g., a feature vector(s) pertaining to unmanaged imported functions). In response to a determination that process 600 is not complete, process 600 returns to 610.

According to various embodiments, the classifier (e.g., machine learning model) is used for predicting whether a .NET file uses information pertaining to the .NET header (e.g., the CLR metadata or CLR header) and information pertaining to the PE header. For example, the system determines feature vectors for characteristics associated with the .NET header and feature vectors for characteristics associated with the PE header. The system may determine a combined feature vector of at least feature vectors for characteristics associated with the .NET header and the feature vectors for characteristics associated with the PE header in connection with querying the classifier.

Figure 7:
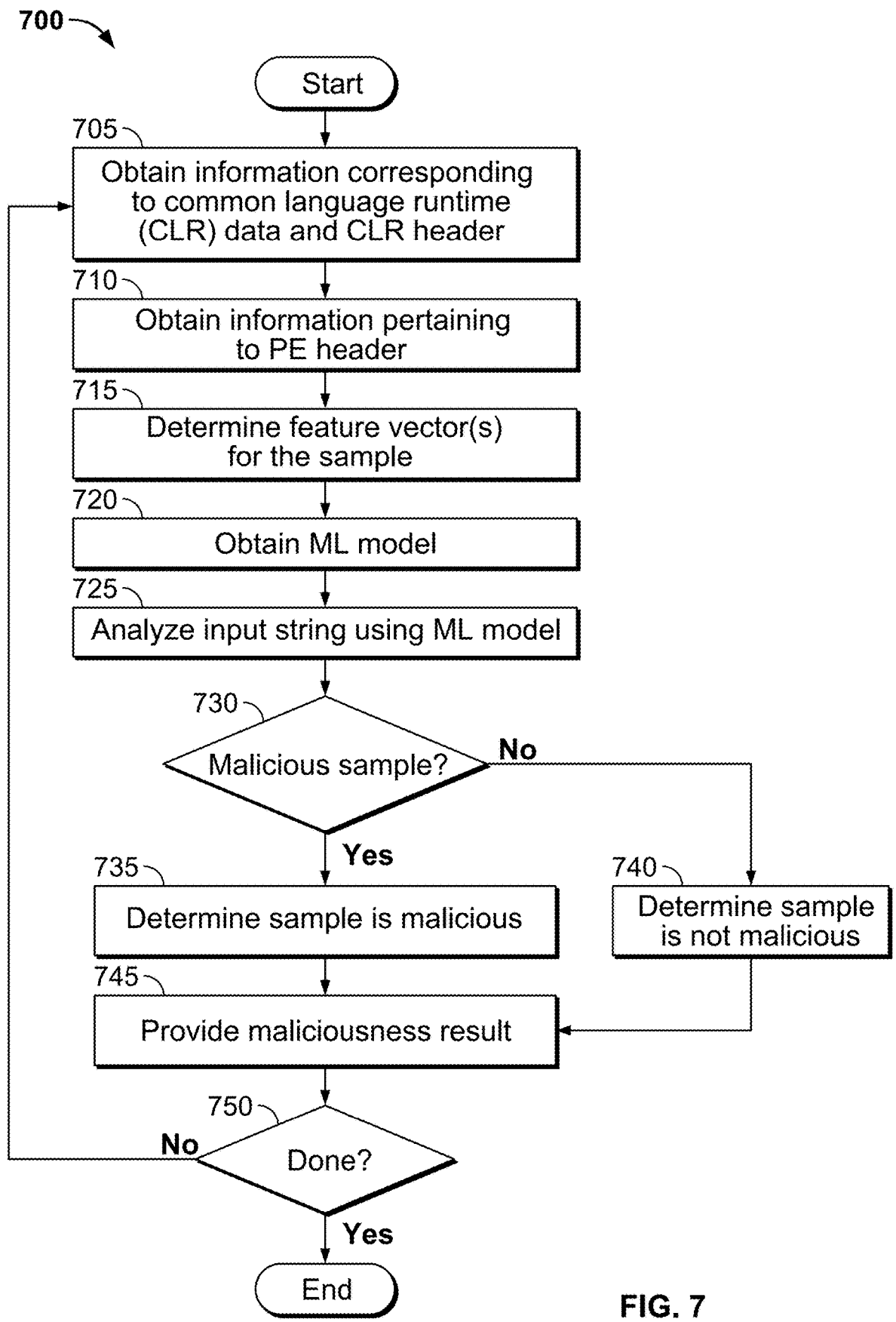
FIG. 7 is a flow diagram of a method for determining whether a file is malicious according to various embodiments.

FIG. 7 is a flow diagram of a method for determining whether a file is malicious according to various embodiments. In some embodiments, process 700 is implemented at least in part by system 100 of FIG. 1 and/or system 200 of FIG. 2. In some implementations, process 700 may be implemented by one or more servers, such as in connection with providing a service to a network (e.g., a security entity and/or a network endpoint such as a client device). In some implementations, process 700 may be implemented by a security entity (e.g., a firewall) such as in connection with enforcing a security policy with respect to files communicated across a network or in/out of the network. In some implementations, process 700 may be implemented by a client device such as a laptop, a smartphone, a personal computer, etc., such as in connection with executing or opening a file such as an email attachment.

According to various embodiments, process 700 is invoked in connection with 440 of process 400 of FIG. 4.

At 705, information corresponding to the CLR data and/or CLR header is obtained. The system can receive the .NET file (e.g., from an endpoint or security entity, or otherwise via an interface such as an interface for a database system), and the system characterizes the .NET file such as by determining whether the .NET file (e.g., the CLR metadata or CLR header) exhibits one or more characteristics associated with features corresponding to a model.

At 710, information pertaining to the PE header is obtained. For example, in addition to obtaining information (e.g., characteristics) from the CLR metadata or CLR header, the system obtains information from the PE header of the sample.

At 715, one or more feature vectors are determined based at least in part on the information corresponding to the CLR data and/or CLR header, and the information pertaining to the PE header. The one or more feature vectors are determined based on a set of one or more features associated with a model for predicting whether a .NET file is malicious.

At 720, a model is obtained. In some embodiments, the model is trained based at least in part on a machine learning process. The system may store a mapping of models to predictions for maliciousness. For example, the system may store a mapping of models to types of files for which predictions are to be provided. In response to determining that the sample is a .NET file, the system obtains the model mapped to providing predictions of maliciousness for .NET files. The obtaining the model may include obtaining a path or location at which the model is to be queried.

At 725, the sample is analyzed using the model. In some embodiments, the system queries the model based at least in part on the one or more feature vectors for the sample. In some embodiments, the classifier is a machine learning classifier that is trained using a machine learning process. For example, the classifier corresponds to an XGBoost machine learning classifier model. The system uses a model, such as a machine learning model trained by a machine learning process, in connection with determining whether the .NET file is malicious or a likelihood that the .NET file is malicious. For example, the system uses the XGBoost machine learning classifier model to analyze the one or more feature vectors (e.g., the combined feature vector) to determine whether the .NET file is malicious.

At 730, a determination is performed as to whether the sample is malicious. In some embodiments, the system determines whether the sample is malicious based at least in part on a result of the analysis of the sample using the model.

In some embodiments, the system determines whether classification of the one or more feature vectors corresponding to the sample indicates that the sample corresponds to a malicious .NET file. In some embodiments, if a result of analyzing the feature vector(s) (e.g., the combined feature vector) using the classifier is less than a predefined threshold (e.g., a predefined maliciousness threshold), the system deems (e.g., determines) that the sample is not malicious (e.g., the .NET file is benign). For example, if the result from analyzing the feature vector(s) indicates a likelihood of whether the sample is malicious, then the predefined threshold can correspond to a threshold likelihood. As another example, if the result from analyzing the feature vector(s) indicates a degree of similarity of the sample to a malicious .NET file, then the predefined threshold can correspond to a threshold likelihood. In some embodiments, if a result of analyzing the feature vector(s) (e.g., the combined feature vector) using the classifier is greater than (or greater than or equal to) a predefined threshold, the system deems (e.g., determines) that the sample is malicious (e.g., the .NET file is an exploit).

In response to a determination that the classification of the one or more feature vectors indicates that the sample corresponds to a malicious .NET file at 730, process 700 proceeds to 735 at which the sample .NET file is determined to be malicious.

In response to a determination that the classification of the one or more feature vectors indicates that the sample does not correspond to a malicious .NET file at 730, process 700 proceeds to 740 at which the sample is determined to be not malicious. In some embodiments, the system determines that the sample is benign in response to a determination that the classifier indicates that the sample is not malicious, or that a likelihood that the sample is malicious is less than a predefined maliciousness threshold.

At 745, a maliciousness result is provided. In some embodiments, the system provides an indication of whether the sample corresponds to a malicious .NET file. For example, the system provides an update to a blacklist or other mapping of files to malicious files to include the sample .NET file (e.g., a unique identifier associated with the sample such as a hash, a signature, etc.). The system may further provide the corresponding updated blacklist or other mapping to an endpoint, a security entity, etc. For example, the system pushes an update to the blacklist or other mapping of files to malicious files to other devices that enforce one or more security policies with respect to traffic or files, or that are subscribed to a service of the system.

At 750, a determination is made as to whether process 700 is complete. In some embodiments, process 700 is determined to be complete in response to a determination that no further samples are to be analyzed (e.g., no further predictions for samples are needed), an administrator indicates that process 700 is to be paused or stopped, etc. In response to a determination that process 700 is complete, process 700 ends. In response to a determination that process 700 is not complete, process 700 returns to 705.

Figure 8:
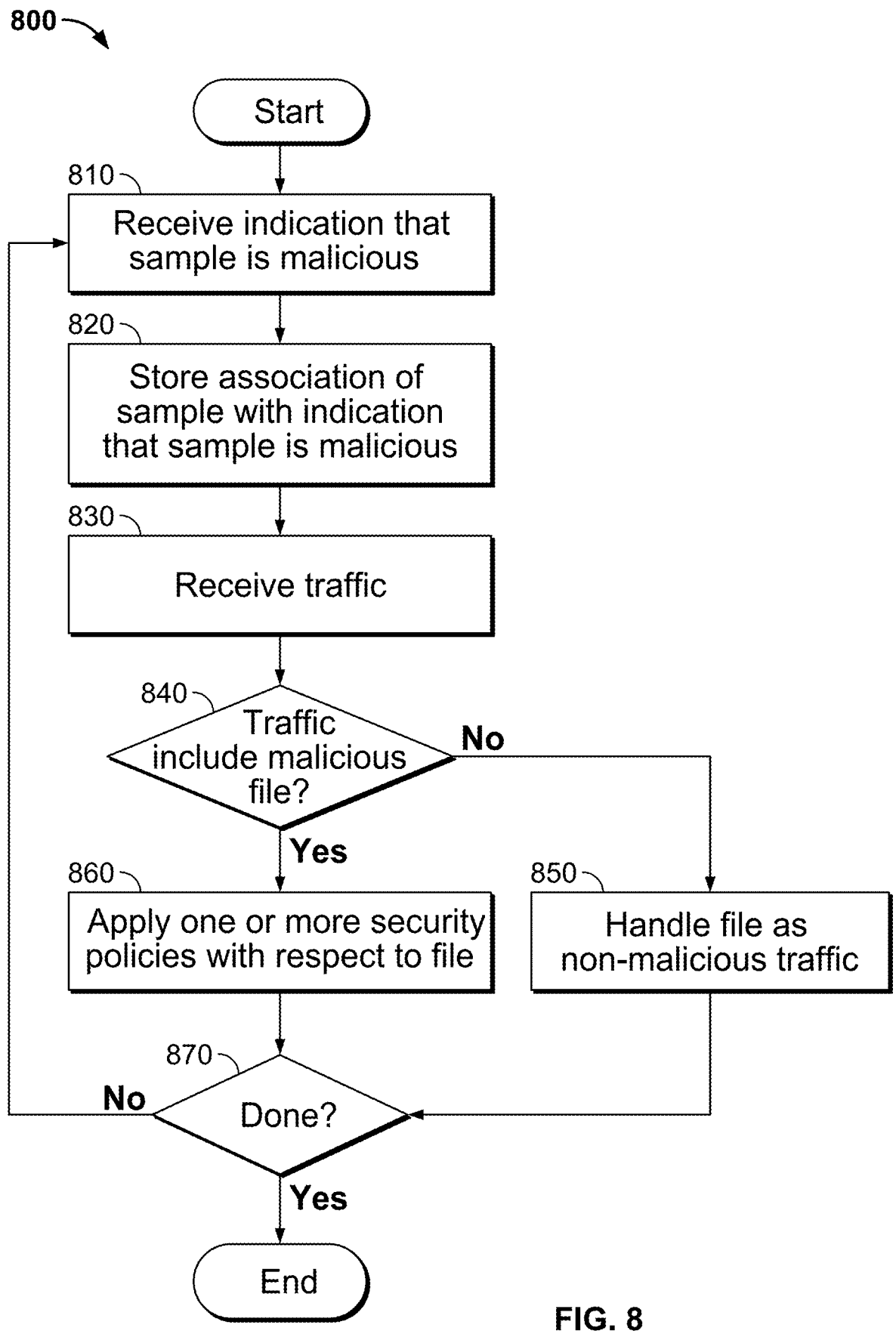
FIG. 8 is a flow diagram of a method for detecting a malicious file according to various embodiments.

FIG. 8 is a flow diagram of a method for detecting a malicious file according to various embodiments. In some embodiments, process 800 is implemented at least in part by system 100 of FIG. 1 and/or system 200 of FIG. 2. In some implementations, process 800 may be implemented by one or more servers, such as in connection with providing a service to a network (e.g., a security entity and/or a network endpoint such as a client device). In some implementations, process 800 may be implemented by a security entity (e.g., a firewall) such as in connection with enforcing a security policy with respect to files communicated across a network or in/out of the network. In some implementations, process 800 may be implemented by a client device such as a laptop, a smartphone, a personal computer, etc., such as in connection with executing or opening a file such as an email attachment.

At 810, an indication that the sample is malicious is received. In some embodiments, the system receives (i) an indication that a sample is malicious and (ii) the sample or hash, signature, or other unique identifier associated with the sample. For example, the system may receive the indication that the sample is malicious from a service such as a security or malware service. The system may receive the indication that the sample is malicious from one or more servers.

According to various embodiments, the indication that the sample is malicious is received in connection with an update to a set of previously identified malicious files. For example, the system receives the indication that the sample is malicious as an update to a blacklist of malicious files.

At 820, an association of the sample with an indication that the sample is malicious is stored. In response to receiving the indication that the sample is malicious, the system stores the indication that the sample is malicious in association with the sample or an identifier corresponding to the sample to facilitate a lookup (e.g., a local lookup) of whether subsequently received files are malicious. In some embodiments, the identifier corresponding to the sample stored in association with the indication that the sample is malicious comprises a hash of the file (or part of the file), a signature of the file (or part of the file), or another unique identifier associated with the file. In some embodiments, the storing the sample in association with the indication of whether the sample is malicious comprises storing an Unmanaged Imphash for the .NET file in association with an indication of whether the sample is malicious.

At 830, traffic is received. The system may obtain traffic such as in connection with routing traffic within/across a network, or mediating traffic into/out of a network such as a firewall, or a monitoring of email traffic or instant message traffic.

At 840, a determination of whether the traffic includes a malicious file is performed. In some embodiments, the system obtains the file from the received traffic. For example, the system identifies the file as an attachment to an email, identifies the file as being exchanged between two client devices via an instant message program or other file exchange program, etc. In response to obtaining the file from the traffic, the system determines whether the file corresponds to a file comprised in a set of previously identified malicious files such as a blacklist of malicious files. In response to determining that the file is comprised in the set of files on the blacklist of malicious files, the system determines that the file is malicious (e.g., the system may further determine that the traffic includes the malicious file).

In some embodiments, the system determines whether the file corresponds to a file comprised in a set of previously identified benign files such as a whitelist of benign files. In response to determining that the file is comprised in the set of files on the whitelist of benign files, the system determines that the file is not malicious (e.g., the system may further determine that the traffic includes the malicious file).

According to various embodiments, in response to determining the file is not comprised in a set of previously identified malicious files (e.g., a blacklist of malicious files) or is comprised in a set of previously identified benign files (e.g., a whitelist of benign files), the system deems the file as being non-malicious (e.g., benign).

According to various embodiments, in response to determining the file is not comprised in a set of previously identified malicious files (e.g., a blacklist of malicious files) or a set of previously identified benign files (e.g., a whitelist of benign files), the system queries a malicious file detector (e.g., a machine learning classifier) to determine whether the file is malicious. For example, the system may quarantine the file until the system receives response from the malicious file detector as to whether the file is malicious. The malicious file detector may perform an assessment of whether the file is malicious such as contemporaneous with the handling of the traffic by the system (e.g., in real-time with the query from the system). The malicious file detector may correspond to malicious file detector 170 of system 100 of FIG. 1 and/or system 200 of FIG. 2.

In some embodiments, the system determines whether the file is comprised in the set of previously identified malicious files or the set of previously identified benign files by computing a hash or determining a signature or other unique identifier associated with the file, and performing a lookup in the set of previously identified malicious files or the set of previously identified benign files for a file matching the hash, signature, or other unique identifier. Various hashing techniques may be implemented. According to various embodiments, the determining whether the file is comprised in the set of previously identified malicious files or the set of previously identified benign files includes determining the Unmanaged Imphash corresponding to the file, and determining whether the Unmanaged Imphash is comprised in a historical dataset (e.g., a dataset comprising results of previous determinations of maliciousness).

In response to a determination that the traffic does not include a malicious file at 840, process 800 proceeds to 850 at which the file is handled as non-malicious traffic/information.

In response to a determination that the traffic does include a malicious file at 840, process 800 proceeds to 860 at which the file is handled as malicious traffic/information. The system may handle the malicious traffic/information based at least in part on one or more policies such as one or more security policies.

According to various embodiments, the handling of the file as malicious traffic/information may include performing an active measure. The active measure may be performed in accordance with (e.g., based at least in part on) one or more security policies. As an example, the one or more security policies may be preset by a network administrator, a customer (e.g., an organization/company) to a service that provides detection of malicious files, etc. Examples of active measures that may be performed include: isolating the file (e.g., quarantining the file), deleting the file, prompting the user to alert the user that a malicious file was detected, providing a prompt to a user when the device attempts to open or execute the file, blocking transmission of the file, updating a blacklist of malicious files (e.g., a mapping of a hash for the file to an indication that the file is malicious), etc.

At 870, a determination is made as to whether process 800 is complete. In some embodiments, process 800 is determined to be complete in response to a determination that no further samples are to be analyzed (e.g., no further predictions for files are needed), an administrator indicates that process 800 is to be paused or stopped, etc. In response to a determination that process 800 is complete, process 800 ends. In response to a determination that process 800 is not complete, process 800 returns to 810.

Figure 9:
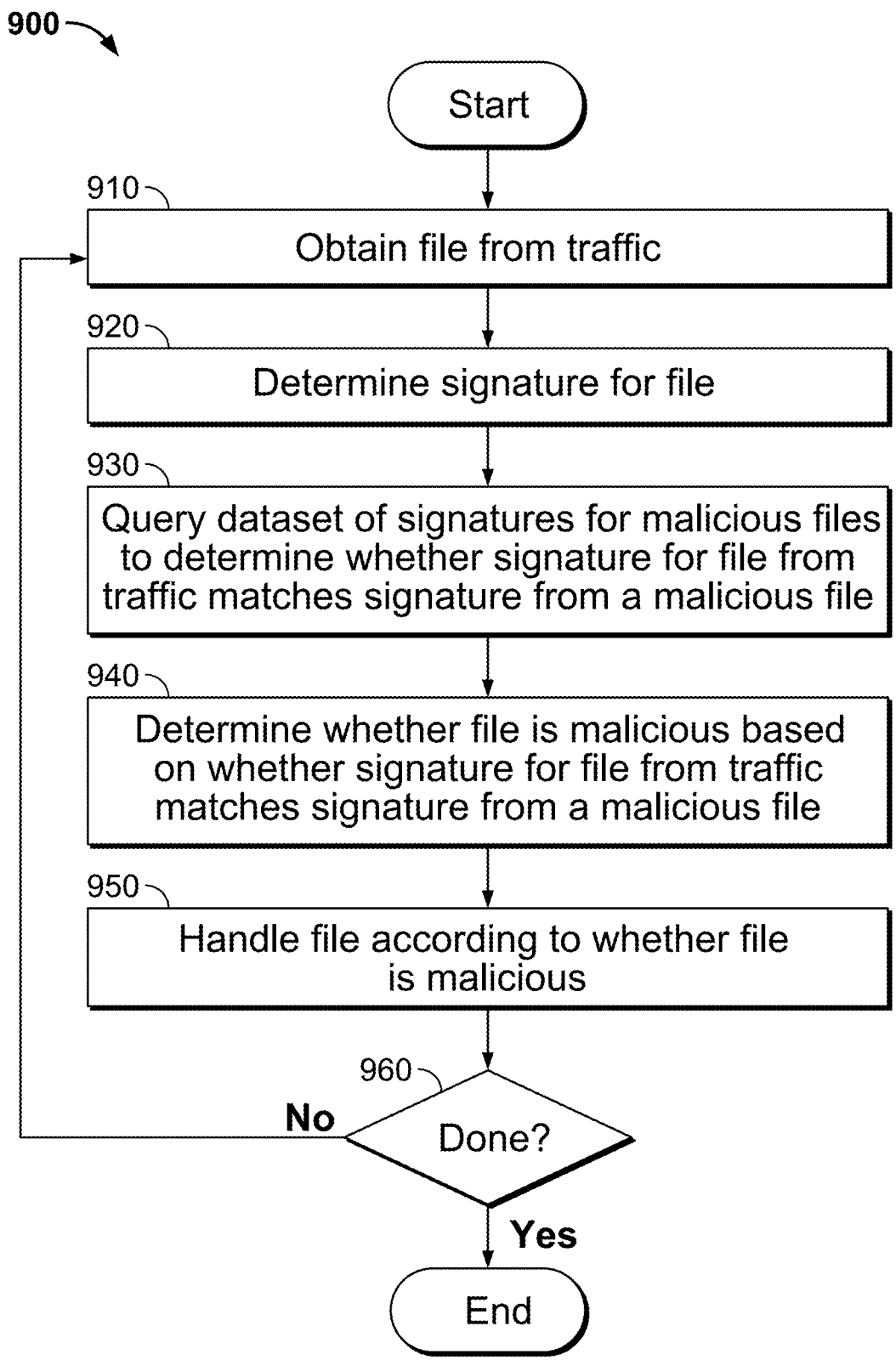
FIG. 9 is a flow diagram of a method for detecting a malicious file according to various embodiments.

FIG. 9 is a flow diagram of a method for detecting a malicious file according to various embodiments. In some embodiments, process 900 is implemented at least in part by system 100 of FIG. 1 and/or system 200 of FIG. 2. In some implementations, process 900 may be implemented by a security entity (e.g., a firewall) such as in connection with enforcing a security policy with respect to files communicated across a network or in/out of the network, and/or an anti-malware application running on a client system, etc. In some implementations, process 900 may be implemented by a client device such as a laptop, a smartphone, a personal computer, etc., such as in connection with executing or opening a file such as an email attachment.

At 910 a file is obtained from traffic. The system may obtain traffic such as in connection with routing traffic within/across a network, or mediating traffic into/out of a network such as a firewall, or a monitoring of email traffic or instant message traffic. In some embodiments, the system obtains the file from the received traffic. For example, the system identifies the file as an attachment to an email, identifies the file as being exchanged between two client devices via an instant message program or other file exchange program, etc.

At 920, a signature corresponding to the file is determined. In some embodiments, the system computes a hash or determines a signature or other unique identifier associated with the file. Various hashing techniques may be implemented. For example, the hashing technique may be the determining (e.g., computing) the MD5 hash for a file. In some embodiments, the determining a signature corresponding to the file comprises computing an Unmanaged Imphash for the .NET file.

At 930, a dataset for signatures of malicious files is queried to determine whether the signature corresponding to the file matches a signature from a malicious file. In some embodiments, the system performs a lookup in the dataset for signatures of malicious files for a file matching the hash, signature, or other unique identifier. The dataset for signatures of malicious files may be stored locally at the system or remotely on a storage system that is accessible to the system.

According to various embodiments, the determining whether the file is comprised in the set of previously identified malicious files or the set of previously identified benign files includes determining the Unmanaged Imphash corresponding to the file, and determining whether the Unmanaged Imphash is comprised in a historical dataset (e.g., a dataset comprising results of previous determinations of maliciousness).

At 940, a determination of whether the file is malicious is made based at least in part on whether a signature for the file matches a signature for a malicious sample. In some embodiments, the system determines whether the dataset of a malicious signature comprises a record matching the signature for the file obtained from traffic. In response to determining that the historical dataset comprises an indication that a file corresponding to the Unmanaged Imphash is malicious (e.g., the Unmanaged Imphash is included in a blacklist of fields), the system deems the file obtained from the traffic at 910 to be malicious.

At 950, the file is handled according to whether the file is malicious. In some embodiments, in response to determining that the file is malicious, the system applies one or more security policies with respect to the file. In some embodiments, in response to determining that the file is not malicious, the system handles the file as being benign (e.g., the file is handled as normal traffic).

At 960, a determination is made as to whether process 900 is complete. In some embodiments, process 900 is determined to be complete in response to a determination that no further samples are to be analyzed (e.g., no further predictions for files are needed), an administrator indicates that process 900 is to be paused or stopped, etc. In response to a determination that process 900 is complete, process 900 ends. In response to a determination that process 900 is not complete, process 900 returns to 910.

Figure 10:
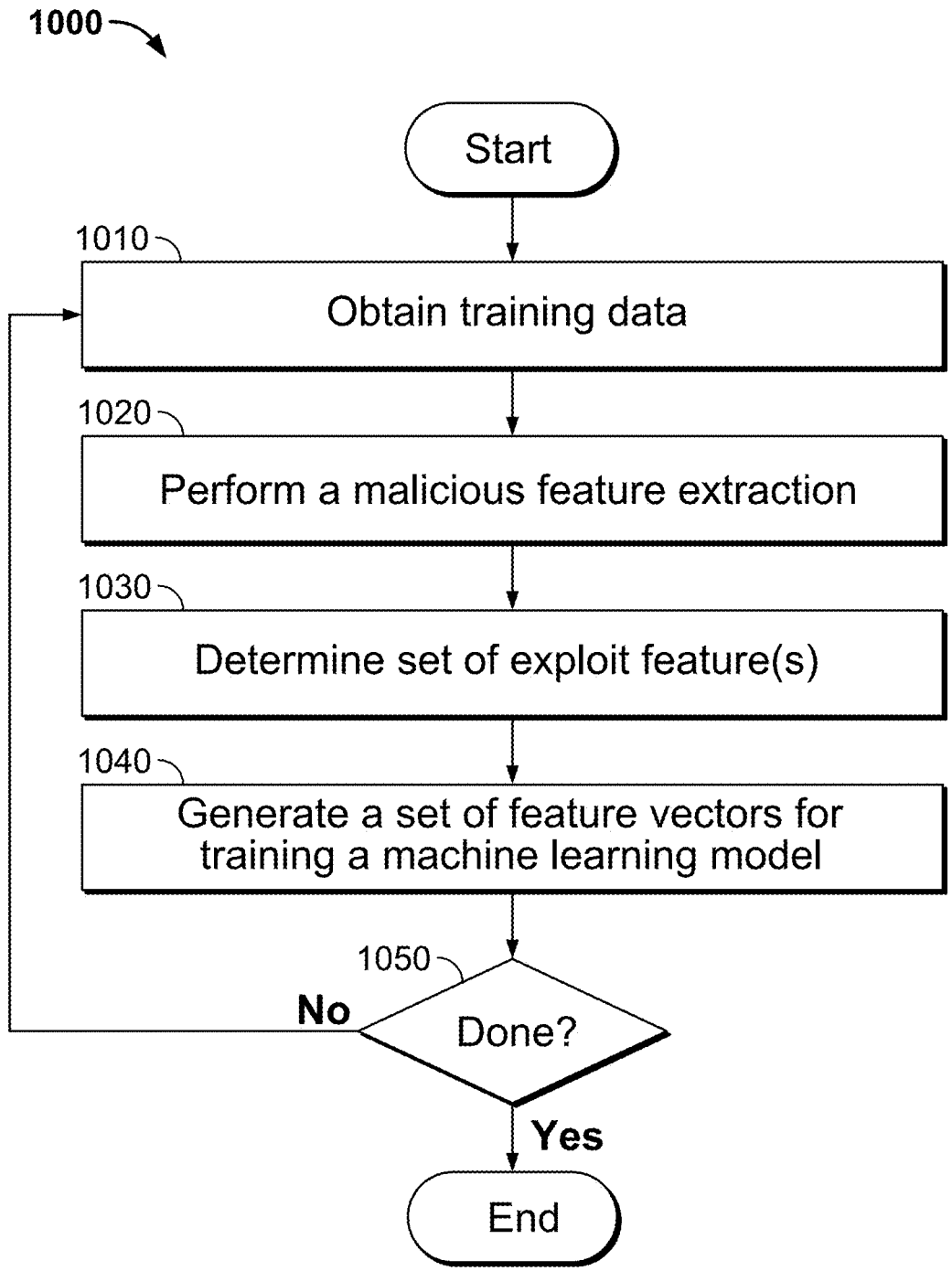
FIG. 10 is a flow diagram of a method for determining a classifier for detecting a malicious file according to various embodiments.

FIG. 10 is a flow diagram of a method for determining a classifier for detecting a malicious file according to various embodiments. In some embodiments, process 1000 is implemented at least in part by system 100 of FIG. 1 and/or system 200 of FIG. 2. In some implementations, process 1000 may be implemented by one or more servers, such as in connection with providing a service to a network (e.g., a security entity and/or a network endpoint such as a client device). In some implementations, process 1000 may be implemented by a security entity (e.g., a firewall) such as in connection with enforcing a security policy with respect to input strings or files communicated across a network or in/out of the network.

At 1010, training data is obtained. In some embodiments, the training data used in connection with determining the features (e.g., to perform malicious feature extraction) is different from the training data used to train the model with the determined features. For example, the training data used to train the model may comprise a subset of sample exploit traffic and a subset of sample benign traffic, and the training data used to determine the features (e.g., exploit features) may exclude (e.g., not include) the sample benign traffic. In some embodiments, the features used to train the model are determined based on sample exploit traffic (e.g., no sample benign traffic is used for malicious feature extraction, etc.).

In some embodiments, the training data comprises a set of malicious .NET files (e.g., .NET files previously determined to be malicious) and/or a set of benign .NET files (e.g., .NET files previously determined to be benign). In some embodiments, rather than comprising a set of NET files, the training data includes information pertaining to a set of .NET files (e.g., information for a set of malicious .NET files and/or information for a set of benign .NET files). The information pertaining to the .NET files can be anonymized. The information pertaining to the .NET files can be information used for one or more features associated with a model.

At 1020, a malicious feature extraction is performed. In some embodiments, the system performs a malicious feature extraction in connection with generating (e.g., training) a model to detect exploits. The malicious feature extraction can include one or more of (i) using a set of predefined features, and (ii) using an algorithmic-based feature extraction to filter out described features from a set of raw input data.

In some embodiments, the set of predefined features can be set by an administrator or other user of the system. For example, the predefined regex statements are manually defined and stored at the system (e.g., stored at a security policy or within a policy for training the model).

In some embodiments, the set of exploit features are determined based at least in part on one or more characteristics of a set of malicious .NET files. As an example, the set of exploit features are determined based at least in part on one or more characteristics of the set of malicious .NET files relative to one or more characteristics of a set of benign .NET files.

At 1030, a set of exploit feature(s) is determined. The set of exploit feature(s) can be determined based on a result of the malicious feature extraction. For example, the system determines a subset of the set of features used to build a classifier (e.g., to train a model using a machine learning process). The system can select features between two threshold values with respect to percentage of exploits in which the features respectively are manifested (e.g., a maximum percentage threshold and a minimum percentage threshold).

At 1040, a set of feature vectors is generated for training a machine learning model. In some embodiments, the set of feature vectors used to train the model are obtained based at least in part on training data. As an example, the training data used to determine the set of feature vectors includes sample exploit traffic (e.g., sample malicious .NET files, or information associated with such, such as CLR data) and sample benign traffic (e.g., sample benign .NET files, or information associated with such).

At 1050, a determination is made as to whether process 1000 is complete. In some embodiments, process 1000 is determined to be complete in response to a determination that no further models are to be determined/trained (e.g., no further classification models are to be created), an administrator indicates that process 1000 is to be paused or stopped, etc. In response to a determination that process 1000 is complete, process 1000 ends. In response to a determination that process 1000 is not complete, process 1000 returns to 1010.

Figure 11:
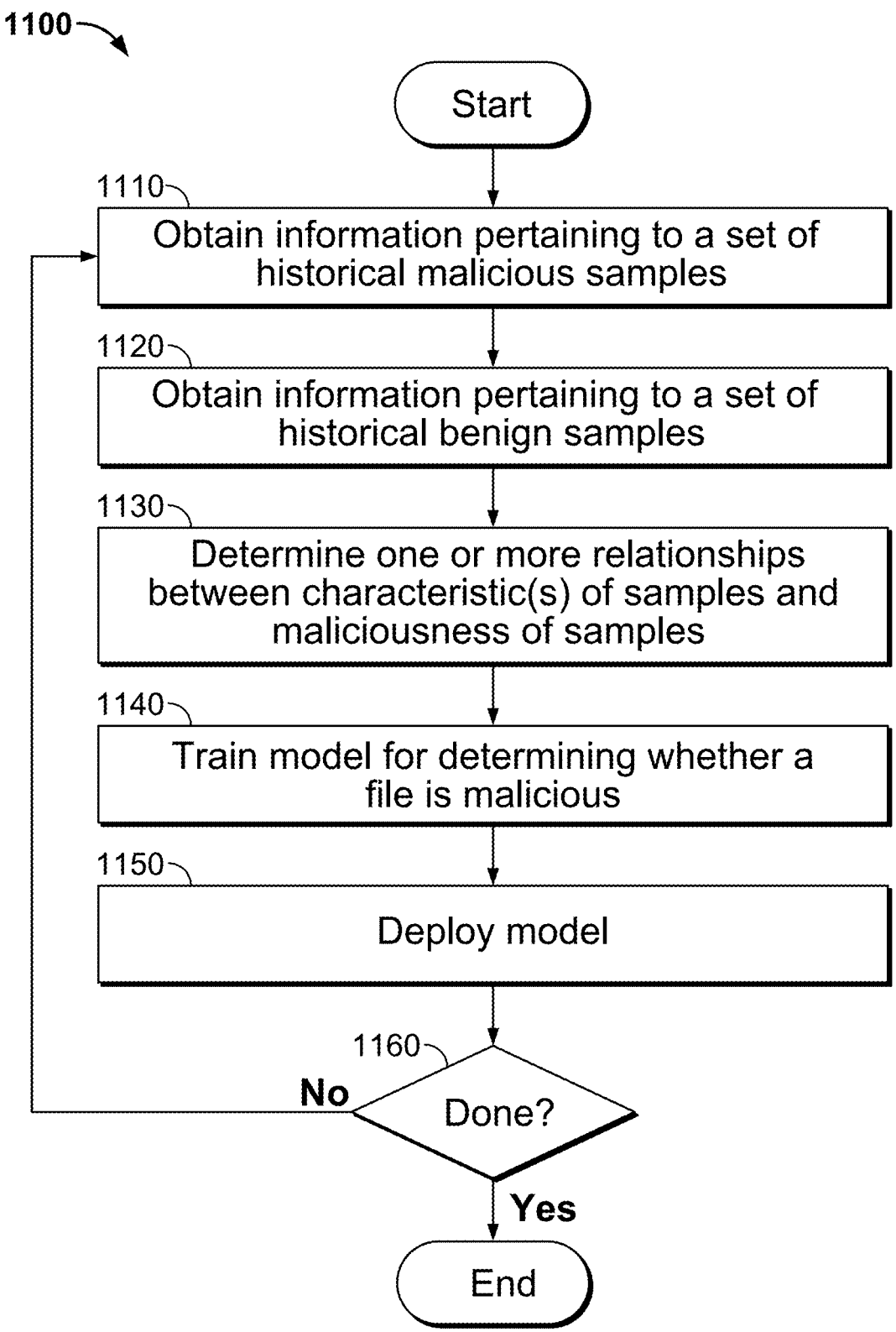
FIG. 11 is a flow diagram of a method for determining a classifier for detecting a malicious file according to various embodiments.

FIG. 11 is a flow diagram of a method for determining a classifier for detecting a malicious file according to various embodiments. In some embodiments, process 1100 is implemented at least in part by system 100 of FIG. 1 and/or system 200 of FIG. 2.

At 1110, information pertaining to a set of historical malicious samples is obtained. In some embodiments, the system obtains the information pertaining to a set of historical malicious samples, or information pertaining to such samples (e.g., CLR data for malicious .NET files), from a third-party service (e.g., VirusTotal™). In some embodiments, the system obtains the information pertaining to a set of historical malicious samples based at least in part on executing the samples known to be malicious and performing a dynamic analysis of the malicious samples (e.g., performing iterative snapshotting of the state of the sandbox or memory structure of the sandbox, etc.).

At 1120, information pertaining to a set of historical benign samples is obtained. In some embodiments, the system obtains the information pertaining to a set of historical benign samples from a third-party service (e.g., VirusTotal™). In some embodiments, the system obtains the information pertaining to a set of historical benign samples based at least in part on executing the samples known to be benign and performing a dynamic analysis of the samples (e.g., performing iterative snapshotting of the state of the sandbox or memory structure of the sandbox, etc.).

At 1130, one or more relationships between characteristics of samples and maliciousness of samples are determined. In some embodiments, the system determines features pertaining to whether a .NET file is malicious or a likelihood that a .NET file is malicious. The features can be determined based on a malicious feature extraction process performed with respect to sample exploit traffic (e.g., a set of sample malicious .NET files or information pertaining to the set of NET files such as CLR data). In some embodiments, the features can be determined with respect to a predefined set of features (e.g., features defined manually by an administrator) and/or with respect to use of an algorithmic-based feature extraction (e.g., TF-IDF, etc.).

At 1140, a model is trained for determining whether .NET file is malicious. In some embodiments, the model is a machine learning model that is trained using a machine learning process. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the model is trained using an XGBoost machine learning classifier model. Inputs to the classifier (e.g., the XGBoost machine learning classifier model) are a combined feature vector or set of feature vectors and based on the combined feature vector or set of feature vectors, the classifier model determines whether the corresponding NET file is malicious, or a likelihood that the .NET file is malicious.

At 1150, the model is deployed. In some embodiments, the deploying the model includes storing the model in a dataset of models for use in connection with analyzing NET files to determine whether the .NET files are malicious. The deploying the model can include providing the model (or a location at which the model can be invoked) to a malicious .NET file detector, such as malicious file detector 170 of system 100 of FIG. 1, or to system 200 of FIG. 2.

At 1160, a determination is made as to whether process 1100 is complete. In some embodiments, process 1100 is determined to be complete in response to a determination that no further models are to be determined/trained (e.g., no further classification models are to be created), an administrator indicates that process 1100 is to be paused or stopped, etc. In response to a determination that process 1100 is complete, process 1100 ends. In response to a determination that process 1100 is not complete, process 1100 returns to 1110.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
   receive a sample that comprises a .NET file;
   obtain information pertaining to common language runtime (CLR) metadata and streams associated with the .NET file, wherein:
   the CLR metadata and streams comprises information pertaining to imported application programming interface (API) function names extracted from a .NET header for the .NET file; and obtaining information pertaining to the CLR metadata and streams associated with the .NET file comprises:
  obtaining a NET assembly for the .NET file;
  obtaining an ImplMap table based on the NET header for the NET file;
  obtaining an ImportName value from ImportName column of the ImplMap table;
  determining whether the ImportName value is non-zero; and
  obtaining an API function name for a particular API function based on a determination of whether the ImportName value is non-zero, wherein:
    in response to a determination that the ImportName value is non-zero, the API function name is obtained based at least in part on an index value obtained from the ImplMap table; and
    in response to a determination that the ImportName value is zero, the API function name is obtained based at least in part on an index value obtained from a MemberForwarded column of the ImplMap table; and
  obtaining a library identifier corresponding to the API function name for the particular API function;
determine whether the sample is malware based at least in part on (i) a classifier, and (ii) a feature vector determined based at least in part on the information pertaining to the CLR metadata and streams, wherein the feature vector is determined based at least in part on the library identifier; and
a memory coupled to the one or more processors and configured to provide the one or more processors with instructions.

2. The system of claim 1, wherein the classifier is a model that is trained using a machine learning process.

3. The system of claim 1, wherein determining whether the sample is malware comprises querying the classifier based on the information pertaining to the CLR metadata and streams.

4. The system of claim 1, wherein:
  obtaining the information pertaining to the CLR metadata and streams associated with the .NET file comprises:
    determining the feature vector based on the CLR metadata and streams associated with the .NET file; and
    determining whether the sample is malware comprising:
      querying the classifier based on the feature vector.

5. The system of claim 1, wherein the one or more processors are further configured to:
  send, to a security entity, an indication that the sample is malicious.

6. The system of claim 5, wherein sending the indication that the sample is malicious to the security entity comprises:
  updating a blacklist of files that are deemed to be malicious, the blacklist of files being updated to include an identifier corresponding to the sample.

7. The system of claim 5, wherein the security entity corresponds to a firewall.

8. The system of claim 1, wherein the CLR metadata associated with the .NET file comprises information pertaining to one or more of imports, bytecode, strings, and resources.

9. The system of claim 1, wherein obtaining the information pertaining to the CLR metadata and streams associated with the .NET file comprises:
  extracting one or more features from the CLR metadata and streams.

10. The system of claim 9, wherein the one or more features correspond to one or more of: a CLR header field(s), a data table(s), a string stream(s), an unmanaged function(s), an unmanaged module(s), an external assembly referenced, an anti-analysis indicator, a type of references, and a resource.

11. The system of claim 1, wherein the classifier is an XGBoost model.

12. The system of claim 1, wherein the classifier is one or more of a random forest model or a neural network model.

13. The system of claim 1, wherein obtaining the information pertaining to the CLR metadata and streams associated with the .NET file comprises:
  parsing the .NET header of the .NET file; and
  extracting information pertaining to the CLR metadata and streams based at least in part on the parsed .NET header.

14. The system of claim 13, wherein extracting the information pertaining to the CLR metadata and streams based at least in part on the parsed .NET header comprises extracting the imported API function names from the parsed .NET header based at least in part on the ImplMap table.

15. The system of claim 1, wherein the ImplMap table indicates a set of unmanaged methods that are imported in connection with execution of the .NET file.

16. The system of claim 1, wherein determining whether the sample is malware is performed in a sandbox environment.

17. The system of claim 1, wherein the determining whether the sample is malware is performed at a security entity.

18. The system of claim 1, wherein determining whether the sample is malware is further based on information extracted from a portable executable (PE) header of the .NET file.

19. A method, comprising:
  receiving, by one or more processors, a sample that comprises a .NET file;
  obtaining information pertaining to common language runtime (CLR) metadata and streams associated with the .NET file, wherein;
    the CLR metadata and streams comprises information pertaining to imported application programming interface (API) function names extracted from a .NET header for the .NET file; and
  obtaining information pertaining to the CLR metadata and streams associated with the .NET file comprises:
    obtaining a NET assembly for the .NET file;
    obtaining an ImplMap table based on the .NET header for the .NET file;
    obtaining an ImportName value from ImportName column of the ImplMap table;
    determining whether the ImportName value is non-zero; and
    obtaining an API function name for a particular API function based on a determination of whether the ImportName value is non-zero, wherein:
      in response to a determination that the ImportName value is non-zero, the API function name is obtained based at least in part on an index value obtained from the ImplMap table; and
      in response to a determination that the ImportName value is zero, the API function name is obtained based at least in part on an index value obtained from a MemberForwarded column of the ImplMap table; and
obtained a library identifier corresponding to the API function name for the particular API function;
determining whether the sample is malware based at least in part on (i) a classifier, and (ii) a feature vector determined based at least in part on the information pertaining to the CLR metadata and streams, wherein the feature vector is determined based at least in part on the library identifier.

20. A computer program product embodied in a non-transitory computer readable medium and comprising computer instructions for:
receiving, by one or more processors, a sample that comprises a .NET file;
obtaining information pertaining to common language runtime (CLR) metadata and streams associated with the .NET file, wherein:
the CLR metadata and streams comprises information pertaining to imported application programming interface (API) function names extracted from a .NET header for the .NET file; and
obtaining information pertaining to the CLR metadata and streams associated with the .NET file comprises:
obtaining a .NET assembly for the .NET file;
obtaining an ImplMap table based on the .NET header for the .NET file;
obtaining an ImportName value from ImportName column of the ImplMap table;
determining whether the ImportName value is non-zero; and
obtaining an API function name for a particular API function based on a determination of whether the ImportName value is non-zero, wherein:
in response to a determination that the ImportName value is non-zero, the API function name is obtained based at least in part on an index value obtained from the ImplMap table; and
in response to a determination that the ImportName value is zero, the API function name is obtained based at least in part on an index value obtained from a MemberForwarded column of the ImplMap table; and
obtaining a library identifier corresponding to the API function name for the particular API function;
determining whether the sample is malware based at least in part on (i) a classifier, and (ii) a feature vector determined based at least in part on the information pertaining to the CLR metadata and streams, wherein the feature vector is determined based at least in part on the library identifier.

21. A system, comprising:
one or more processors configured to:
obtain a set of .NET of NET files;
perform a malicious feature extraction with respect to common language runtime (CLR) metadata and streams associated with the set of .NET files to obtain a set of features, wherein the CLR metadata and streams comprises information pertaining to imported application programming interface (API) function names extracted from a .NET header for the .NET file, and wherein the imported API function names are extracted based at least in part on:
obtaining information pertaining to the CLR metadata and streams associated with the .NET file comprises:
obtaining a .NET assembly for the .NET file;
obtaining an ImplMap table based on the .NET header for the NET file;
obtaining an ImportName value from ImportName column of the ImplMap table;
determining whether the ImportName value is non-zero; and
obtaining an API function name for a particular API function based on a determination of whether the ImportName value is non-zero, wherein:
in response to a determination that the ImportName value is non-zero, the API function name is obtained based at least in part on an index value obtained from the ImplMap table; and
in response to a determination that the ImportName value is zero, the API function name is obtained based at least in part on an index value obtained from a MemberForwarded column of the ImplMap table; and
obtaining a library identifier corresponding to the API function name for the particular API function; and
apply a machine learning process to train a model to detect malicious .NET files, the model being trained based at least in part on the set of features and information pertaining to the set of .NET files, wherein at least one feature is determined based at least in part on the library identifier; and
a memory coupled to the one or more processors and configured to provide the one or more processors with instructions.

22. A method, comprising:
obtaining a set of .NET files;
performing a malicious feature extraction with respect to common language runtime (CLR) metadata and streams associated with the set of .NET files to obtain a set of features wherein the CLR metadata and streams comprises information pertaining to imported application programming interface (API) function names extracted from of .NET of NET header for the .NET file, and wherein the imported API function names are extracted based at least in part on:
obtaining information pertaining to the CLR metadata and streams associated with the .NET file comprises:
obtaining a .NET assembly for the .NET file;
obtaining an ImplMap table based on the NET header for the .NET file;
obtaining an ImportName value from ImportName column of the ImplMap table;
determining whether the ImportName value is non-zero; and
obtaining an API function name for a particular API function based on a determination of whether the ImportName value is non-zero, wherein:
in response to a determination that the ImportName value is non-zero, the API function name is obtained based at least in part on an index value obtained from the ImplMap table; and
in response to a determination that the ImportName value is zero, the API function name is obtained based at least in part on an index value obtained from a MemberForwarded column of the ImplMap table; and
obtaining a library identifier corresponding to the API function name for the particular API function; and applying a machine learning process to train a model to detect malicious .NET files, the model being trained based at least in part on the set of features and information pertaining to the set of .NET of NET files, wherein at least one feature is determined based at least in part on the library identifier.

23. A system, comprising:
one or more processors configured to:
  receive a sample that comprises a .NET file;
  obtain information pertaining to common language runtime (CLR) metadata and streams associated with the .NET file based at least in part on:
    parsing a .NET header of the .NET file; and
    extracting information pertaining to the CLR metadata and streams based at least in part on the parsed .NET header, including extracting imported application programming interface (API) function names from the parsed .NET header based at least in part on an index table, wherein the extracting the imported API function names comprises:
      obtaining a .NET assembly for the .NET file;
      obtaining an ImplMap table based on the .NET header for the NET file;
      obtaining an ImportName value from ImportName column of the ImplMap table;
      determining whether the ImportName value is non-zero; and
      obtaining an API function name for a particular API function based on a determination of whether the ImportName value is non-zero,
      wherein:
        in response to a determination that the ImportName value is non-zero, the API function name is obtained based at least in part on an index value obtained from the ImplMap table; and
        in response to a determination that the ImportName value is zero, the API function name is obtained based at least in part on an index value obtained from a MemberForwarded column of the ImplMap table; and
      obtaining a library identifier corresponding to the API function name for the particular API function; and
  determine whether the sample is malware based at least in part on (i) a classifier, and (ii) a feature vector determined based at least in part on the information pertaining to the CLR metadata and streams, wherein the feature vector is determined based at least in part on the library identifier; and
a memory coupled to the one or more processors and configured to provide the one or more processors with instructions.

* * * * *